United States Patent [19]
Kikitsu et al.

[11] Patent Number: 5,652,054
[45] Date of Patent: Jul. 29, 1997

[54] MAGNETIC RECORDING MEDIA HAVING A MAGNETIC THIN FILM MADE OF MAGNETIC METALS GRAINS AND NONMAGNETIC MATRIX

[75] Inventors: Akira Kikitsu; Katsutaro Ichihara, both of Yokohama; Hitoshi Iwasaki; Atsuhito Sawabe, both of Yokosuka, all of Japan

[73] Assignee: Kabushiki Kaisha Toshiba, Kawasaki, Japan

[21] Appl. No.: 500,365

[22] Filed: Jul. 10, 1995

[30] Foreign Application Priority Data

Jul. 11, 1994 [JP] Japan ..................................... 6-158842
Sep. 17, 1994 [JP] Japan ..................................... 6-248479

[51] Int. Cl.$^6$ ........................................................ G11B 5/64
[52] U.S. Cl. ........................ 428/328; 428/469; 428/692; 428/694 T; 428/900; 204/192.2; 360/97.01; 360/113
[58] Field of Search ..................................... 428/328, 469, 428/692, 694 T, 900; 204/192.2; 360/113, 97.01

[56] References Cited

U.S. PATENT DOCUMENTS

| | | | |
|---|---|---|---|
| 4,360,441 | 11/1982 | Borrelli et al. | 252/62.59 |
| 4,663,242 | 5/1987 | Pryor et al. | 428/558 |
| 4,751,100 | 6/1988 | Ogawa | 427/38 |
| 4,973,525 | 11/1990 | Chien et al. | 428/692 |
| 5,158,933 | 10/1992 | Holtz et al. | 305/1 |
| 5,186,854 | 2/1993 | Edelstein | 252/62.55 |
| 5,476,680 | 12/1995 | Coffey et al. | 427/130 |

OTHER PUBLICATIONS

M. Goto et al, "Magnetic-Particle-Dispersed Films Produced by Gas-Flow-Sputtering Method", Technical Report of IECE, MR93-58 CPM93-110, pp. 31-36 (1993).

Tsoukatos et al., "Origin of Coercivity in (Fe,Co)-Based Granular Films", J. Appl. Phys. 73(10):6967-6969 (1993).

*Primary Examiner*—Stevan A. Resan
*Attorney, Agent, or Firm*—Finnegan, Henderson, Farabow, Garrett & Dunner, L.L.P.

[57] ABSTRACT

This invention provides a magnetic recording medium having a magnetic thin film made of magnetic metal grains and a nonmagnetic matrix, wherein the hardness of the nonmagnetic matrix is larger than that of the magnetic metal grains, the magnetic metal grains have shape magnetic anisotropy and magneto-crystalline anisotropy, and in the nonmagnetic matrix the content of a magnetic metal element in a central portion between the magnetic metal grains is 20 atomic % or less. This invention also provides a magnetic recording/reproduction apparatus including a magnetic recording medium consisting of a nonmagnetic matrix, which is continuously present in the direction of film thickness and the in-plane direction of a magnetic thin film, and magnetic metal grains held in the nonmagnetic matrix, and a magnetic head for reproducing a signal from the magnetic recording medium by using a resistance change caused by a magnetic field.

20 Claims, 7 Drawing Sheets

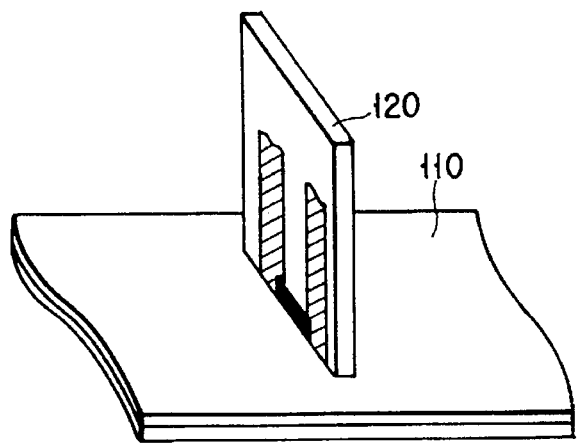
FIG. 11A
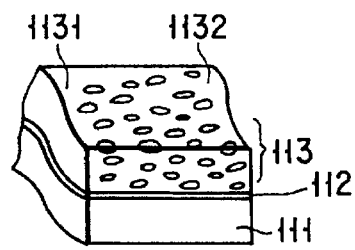
FIG. 11B
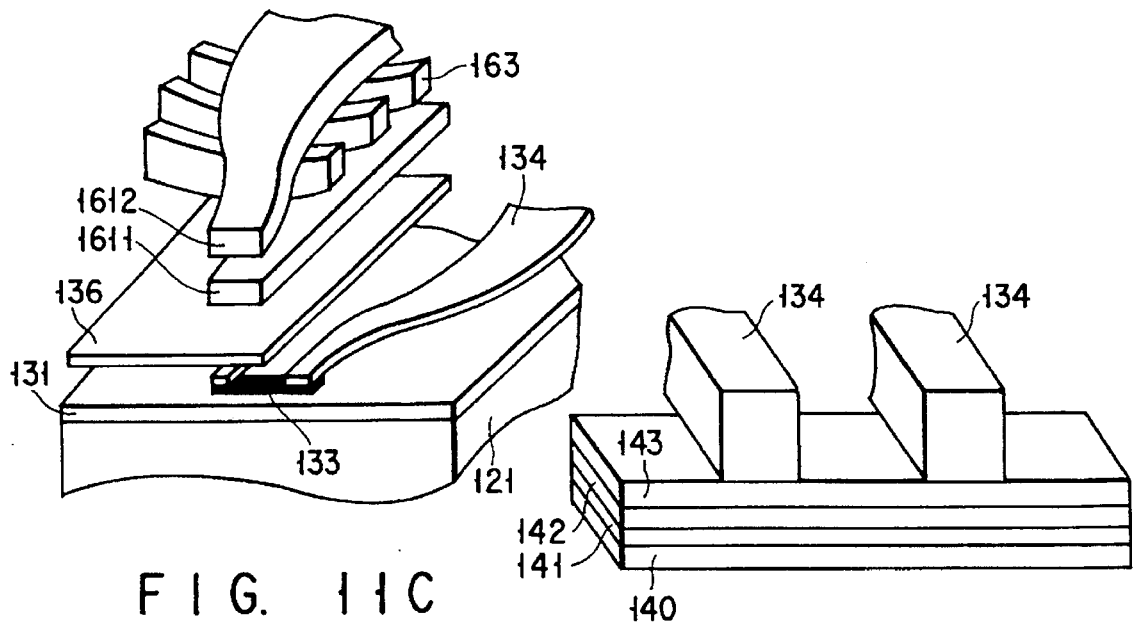
FIG. 11C
FIG. 13
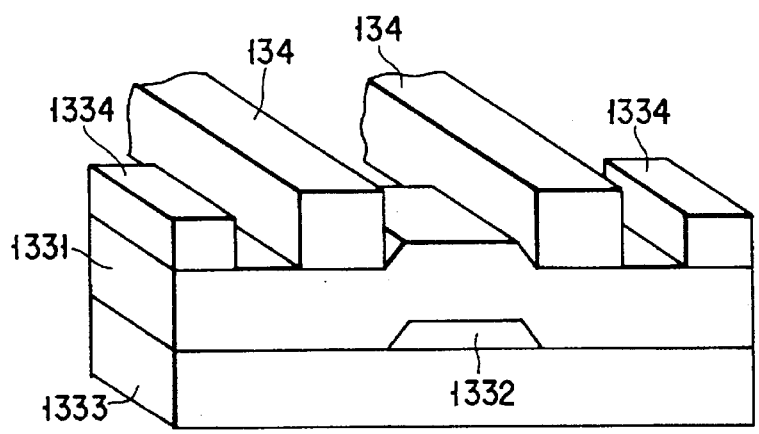
FIG. 12

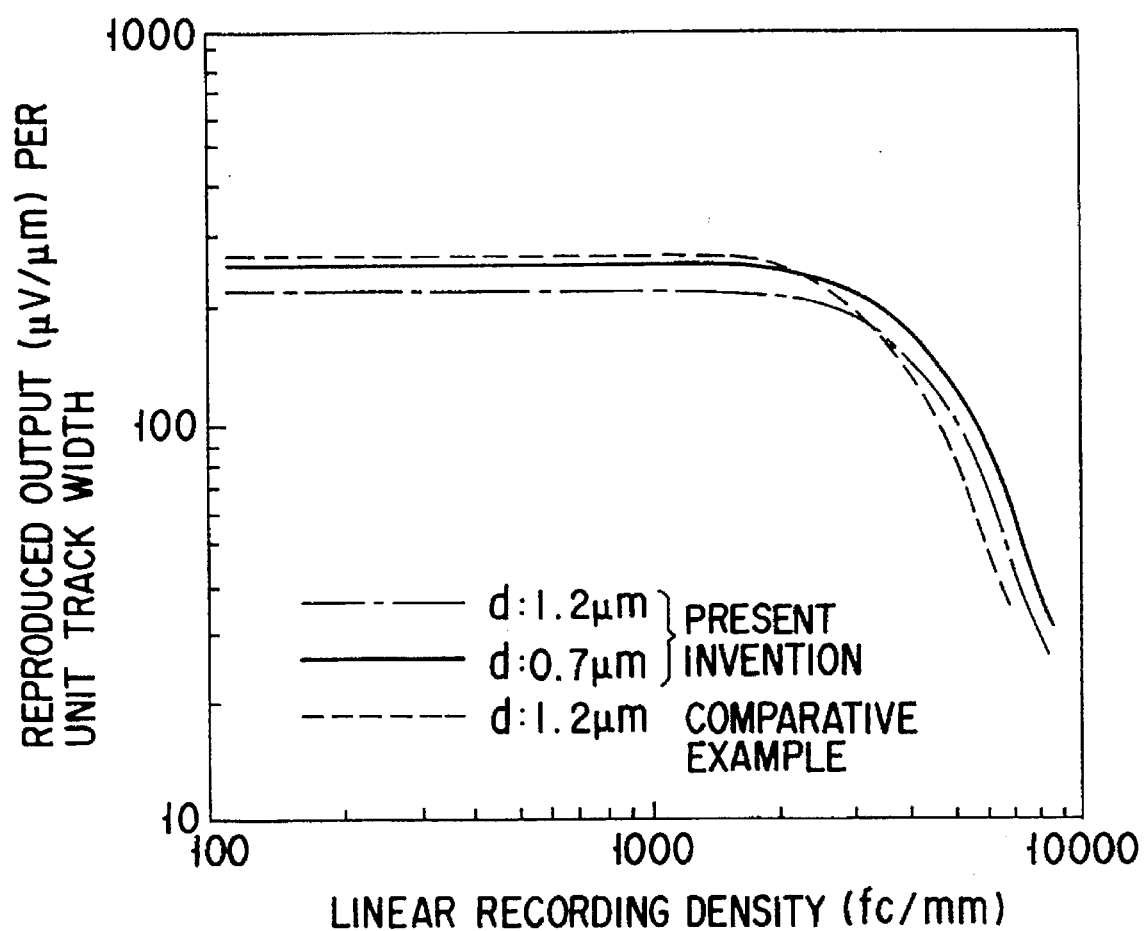
F I G. 17

MAGNETIC RECORDING MEDIA HAVING A MAGNETIC THIN FILM MADE OF MAGNETIC METALS GRAINS AND NONMAGNETIC MATRIX

BACKGROUND OF THE INVENTION

1. Field of the Invention

The present invention relates to a magnetic recording medium and a magnetic recording/reproduction apparatus for use in, e.g., hard disk drives.

2. Description of the Related Art

Hard disk drives aim to improve the recording density by using a metal thin-film medium as a magnetic recording medium and an induction head or an MR head (a magnetoresistance head) as a magnetic head. In order for the magnetic recording medium to float on the magnetic head with a high reliability, a protective film is formed on the surface of the magnetic recording medium to improve the lubricating properties and the durability.

Using the MR head as the magnetic head also requires electrical insulating properties, in addition to the durability, in order to prevent short circuits between the metal thin-film medium having conductivity and the MR head. For this purpose, a protective film having a high electrical resistance is formed on the metal thin-film medium, and a protective film having a high electrical resistance is also formed on the magnetic head.

To improve the recording density, it is necessary to narrow the track width and increase the linear recording density. To increase the linear recording density, it is necessary to decrease the magnetic spacing between the magnetic head and the magnetic recording medium, in addition to narrow the head gap of the magnetic head and sharpen the magnetization transition region of the magnetic recording medium. This spacing is calculated from, e.g., the floating amount of the magnetic recording medium from the magnetic head and the thickness of the protective film formed on the magnetic head or the magnetic recording medium. The floating amount of state-of-the-art products is up to 0.07 μm, and up to 0.038 μm has been achieved on the research level. However, if the floating amount is further decreased, the magnetic recording medium and the magnetic head may come in contact with each other while the magnetic recording medium is being driven, and consequently the magnetic recording medium or the magnetic head may be destroyed.

The thickness of the protective film of the magnetic recording medium of the state-of-the-art products is up to 0.02 μm, and up to 0.012 μm is achieved on the research level. However, in the case of the metal thin-film medium it is difficult to further decrease the protective film thickness while maintaining the durability and high electrical resistivity.

If, on the other hand, a medium made from an electrically insulating magnetic substance such as Ba ferrite is used as the magnetic recording medium, no protective film needs to be formed. However, since such an electrically insulating magnetic substance has a small saturation magnetization compared to those of metal magnetic substances, the strength of the signal magnetic field from the medium is significantly low. For this reason, if a magnetic recording medium made from the electrically insulating magnetic substance is used, it is not possible to ensure the sensitivity necessary to obtain a high enough S/N ratio, even with the use of the MR head as the magnetic head, when the track width is further narrowed in the future.

As described above, the present situation is that no magnetic recording medium which satisfies the above characteristics and is suitable for high-density recording has been attained yet.

SUMMARY OF THE INVENTION

It is an object of the present invention to provide a magnetic recording medium capable of high-density recording.

This object is achieved by a magnetic recording medium having a magnetic thin film made of magnetic metal grains and a nonmagnetic matrix, wherein the hardness of the nonmagnetic matrix is larger than the hardness of the magnetic metal grains, the magnetic metal grains have shape magnetic anisotropy and magneto-crystalline anisotropy, and in the nonmagnetic matrix the content of a magnetic metal element in a central portion between the magnetic metal grains is 20 atomic % or less.

It is another object of the present invention to provide a magnetic recording/reproduction apparatus from which a high-sensitivity reproduced output can be obtained with a high reliability, and which has a high recording density.

This object is achieved by a magnetic recording/reproduction apparatus comprising a magnetic recording medium made of a nonmagnetic matrix, which is continuously present in the direction of film thickness and the in-plane direction of a magnetic thin film, and magnetic metal grains held in the nonmagnetic matrix, and a magnetic head for reproducing a signal from the magnetic recording medium by using a resistance change caused by a magnetic field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11A is a perspective view showing one embodiment of a magnetic recording/reproduction apparatus of the present invention;

FIG. 11B is a view showing a magnetic recording medium of the magnetic recording/reproduction apparatus in FIG. 11A;

FIG. 11C is a view showing a magnetic head of the magnetic recording/reproduction apparatus in FIG. 11A;

FIGS. 12, 13, and 16 are views showing MR films of the magnetic recording/reproduction apparatus of the present invention;

FIGS. 15 and 17 are graphs showing the relationships between the linear recording density and the reproduced output in embodiments of the magnetic recording/reproduction apparatus of the present invention.

DETAILED DESCRIPTION OF THE PREFERRED EMBODIMENTS

Figure 1:
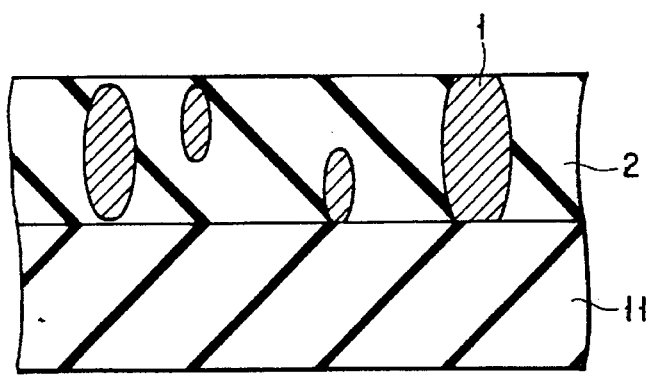
FIGS. 1 and 2 are sectional views showing magnetic recording media of the present invention.

In a magnetic recording medium of the present invention, magnetic metal grains are magnetized in a predetermined direction in accordance with information corresponding to a magnetic recording system. This enables longitudinal recording, oblique recording, or perpendicular recording. Also, the magnetic recording medium of the present invention is applicable to either a system in which a recording/reproduction device (head) comes in contact with a magnetic recording medium or a system in which a head floats from a magnetic recording medium.

In the magnetic recording medium of the present invention, the magnetic metal grains are given shape magnetic anisotropy and magneto-crystalline. Alternatively, the magnetic metal grains are given a shape magnetic anisotropy energy of $10^4$ J/m$^3$ or higher, preferably $5\times10^4$ J/m$^3$ or higher, and a magneto-crystalline anisotropy energy of $5\times10^5$ J/m$^3$ or higher, preferably $10^6$ J/m$^3$ or higher.

The shape magnetic anisotropy and the magneto-crystalline will be briefly described below. Magnetic anisotropy is the properties with which the magnetic characteristics of an object change in accordance with the direction within the object. When the characteristics change due to the shape of a magnetic substance, this magnetic anisotropy is the shape magnetic anisotropy; when the characteristics change due to the crystal structure of a magnetic substance, this magnetic anisotropy is the magneto-crystalline. For example, needle-like magnetic substances have shape magnetic anisotropy since they are easily magnetized in the direction of the long axis. On the other hand, Co has magneto-crystalline since it is easily magnetized in a certain particular direction (the c-axis) in the crystal structure. The magnetic anisotropy energy is the difference between the energy required to point magnetization in a direction in which magnetization is easy and the energy required to point magnetization in a direction in which magnetization is hard. The higher the magnetic anisotropy energy, the more stably the magnetization is pointed in a certain direction. Additionally, when this magnetic anisotropy energy is large, the recorded information can be stably held, and the signal output can be increased. That is, preferable magnetic characteristics as a magnetic recording medium can be obtained.

In the magnetic recording medium of the present invention, by using shape magnetic anisotropy is given in the film thickness direction magnetic metal grains long in the direction of film thickness. This can form a perpendicular magnetic film. A perpendicular magnetic film can also be formed by using a Co alloy as the magnetic metal grains and growing the grains so that the c-axis of the crystal points in the direction of film thickness. When the magnetic metal grains have both shape magnetic anisotropy and magneto-crystalline, the magnetic thin film can be applied to any of perpendicular recording, oblique recording, and longitudinal recording. As an example, when magnetic metal grains made from a Co alloy are long in the film thickness direction and the c-axis of the crystal extends along the same direction, a larger magnetic anisotropy can be attained by the combined effect of the two magnetic anisotropies. Consequently, the coercive force can be increased, and this allows higher-density recording with smaller recording magnetic domains.

A medium for longitudinal recording is said to be suitable for high-density recording when the medium has perpendicular magnetic anisotropy to a certain degree. This can be realized when magnetic metal grains whose c-axis is oriented in the in-plane direction are long in the film thickness direction. Note that the shape magnetic anisotropy and the magneto-crystalline have different origins and hence can be easily controlled independently of each other in the medium manufacturing process or in the material selection. Therefore, it is reckoned that having these two magnetic anisotropies is preferable for a high-density magnetic recording medium. Note also that the magnitude, the direction, and the like factor of the magnetic anisotropy are determined by, e.g., the material of the magnetic recording medium, the apparatus for manufacturing the medium, and the specifications required for the drive.

The magnetic recording medium of the present invention is comprised of a magnetic thin film consisting of a nonmagnetic matrix continuously present in the direction of film thickness and the in-plane direction and magnetic metal grains held in the nonmagnetic matrix. The statement "the nonmagnetic matrix is continuously present in the film thickness direction and the in-plane direction" means that the nonmagnetic matrix has a network structure. In the present invention the nonmagnetic matrix has roles of improving the mechanical strength of the whole magnetic thin film, increasing the electrical resistivity, and separating the magnetic interaction between the magnetic metal grains.

It is desirable that the material of the magnetic metal grains have a large saturation magnetization Is and a large magnetic anisotropy. Examples of the material are Co, Pt, Sm, Fe, Ni, Cr, Mn, Bi, Al, and alloys of these elements. It is particularly preferable to use a Co alloy having a large magneto-crystalline such as CoPt, SmCo, or CoCr, or an Mn alloy having a large anisotropy energy such as MnBi or MnAl. It is also possible to add Fe and/or Ni to these metals or alloys in order to control the magnetic characteristics. Furthermore, it is possible to add, e.g., Cr, Nb, V, Ta, Ti, W, Hf, In, Si, and B to these metals or alloys in order to improve the magnetic characteristics.

Although the shape of the magnetic metal grains can be a sphere, to improve the shape magnetic anisotropy a columnar shape or a spheroidal shape is preferred. The magnetic metal grains are magnetized in a desired direction (e.g., the in-plane direction of the surface of the medium, a direction perpendicular to the medium surface, or an intermediate direction of the two) in accordance with information to be recorded, and thereby the information is recorded. The magnetic metal grains are easily magnetized in the in-plane direction when they are arranged such that the long-axis direction is inclined to the in-plane direction of the magnetic recording medium. On the other hand, when the magnetic metal grains are arranged such that the long-axis direction is inclined to the direction perpendicular to the surface of the magnetic recording medium, they are easily magnetized in the perpendicular direction.

Generally, it is difficult to accurately determine particular physical properties required of a magnetic recording medium to achieve the purpose of preventing damages when a magnetic head comes in contact with the magnetic recording medium. However, hardness can be adopted as one reference. In principle it is considered that the higher the hardness the less damages inflicted on a magnetic recording medium upon contact with a magnetic head.

From this viewpoint, a material having a high hardness and a high resistivity in the form of a bulk is used as the nonmagnetic matrix. Generally, materials which are hard in the form of a bulk keep a sufficient hardness even when formed into a thin film. A compound represented by Formula M-G is an example of this sort of the material of the nonmagnetic matrix. In this formula, M represents at least one element selected from the group consisting of Si, Al, Zr, Ti, In, Sn, and B, and G represents at least one element selected from the group consisting of oxygen, nitrogen, and carbon. Specific favorable examples are Si—O, Al—O, Zr—O, Ti—O, Si—N, Al—N, Zr—N, Ti—N, B—N, Si—C, Ti—C, B—C, SiAl—ON, Si—ON, AlTi—OC, and In—Sn—O. As the material of the nonmagnetic matrix, it is also possible to use an allotrope of carbon, e.g., diamond, amorphous carbon, or diamond-like carbon, which has good lubricating properties and a high hardness in the bulk form. It is preferable that the hardness of the bulk of the material of this sort which forms the nonmagnetic matrix be equal to or higher than a Vickers hardness of 2 GPa which bulk $SiO_2$ has. Furthermore, the use of a material made from an electrical insulator or a semiconductor as the material of the nonmagnetic matrix makes it possible to greatly increase the electrical resistivity of the whole magnetic recording medium compared to those of metal thin-film media.

Also, a nonmagnetic element can be added to the materials described above in order to improve the hardness or the abrasion resistance of the nonmagnetic matrix. In this case the additional element can be present either in the form of a solid solution or in the phase-separated form in the nonmagnetic matrix. The additional element can also be present in the form of fine grains in the nonmagnetic matrix. The form of the additional element is properly chosen in accordance with the mechanical characteristics or the magnetic characteristics of the magnetic thin film in which the magnetic metal grains are dispersed.

In the magnetic thin film of the present invention, when the element as described above is added to improve the characteristics of the magnetic metal grains or of the nonmagnetic matrix, the same element can be added to the magnetic metal grains and the nonmagnetic matrix. Also, as will be described later it is in practice not possible to form a composite film in which the magnetic metal grains and the nonmagnetic matrix are perfectly separated on the atomic level. Accordingly, the element added to the magnetic metal grains can be present in the nonmagnetic matrix. If this is the case, to more efficiently achieve the effect of the additional element the ratio of the additional element in the nonmagnetic matrix to that in the magnetic metal grains need only be $1/10$ or smaller, more preferably $1/100$ or smaller. This relationship holds even when the nonmagnetic matrix and the magnetic metal grains are interchanged.

Metal, glass, ceramic, and the like material can be used as a substrate for supporting the magnetic thin film consisting of the magnetic metal grains and the nonmagnetic matrix. Note that an undercoating layer made from a magnetic or nonmagnetic substance can be formed between the substrate and the magnetic thin film. Especially when a metal substrate is used, it is desirable to use an undercoating layer with electrical insulating properties in order to prevent short circuits between the magnetic head and the magnetic recording medium. It is also possible, if necessary, to form a very thin (100 Å or less) protective film on the surface of the magnetic recording medium. Furthermore, it is desirable that the magnetic metal grains be held in the nonmagnetic matrix with a distance (2 nm or more) by which no magnetic exchange coupling force arises between the grains. This is not only to increase the electrical resistance but to improve the coercive force of the magnetic recording medium and reduce the medium noise.

To perform efficient recording/reproduction for the magnetic thin film, the undercoating layer made from a magnetic substance is magnetically coupled to magnetic domains in the magnetic thin film or to a recording/reproduction head by an exchange coupling or magnetostatic interaction. When the undercoating layer is used the magnetic domains, it is effective for a method of stabilizing magnetic domains to use an undercoating layer made from a magnetic substance whose magnetization is easy to reverse, or it is effective for increasing the reproduced output to use an undercoating layer made from a magnetic substance having a large magnetization.

An undercoating layer made from a nonmagnetic substance is formed in order to control the crystal structure of the magnetic metal grains or of the nonmagnetic matrix or to prevent mixing of impurities from the substrate. For example, it is feasible to control the lattice spacing of a desired crystal structure of the magnetic metal grains by the use of an undercoating layer made from a material having a lattice spacing close to the lattice spacing of the crystal of the magnetic metal grains. It is also possible to control the crystallinity or the amorphous properties of the magnetic metal grains or the nonmagnetic matrix by using an amorphous undercoating layer having a certain surface energy. Prevention of mixture of impurities from the substrate can be accomplished by using a thin film with a small lattice spacing or a dense thin film as the undercoating layer. Each of the undercoating layer made from a magnetic substance and the undercoating layer made from a nonmagnetic substance can have the function of the other. That is, the undercoating layer constructed from a magnetic substance can have the properties of controlling the crystallinity of the magnetic metal grains. This is preferable since the effect of improving the recording/reproduction characteristics and the effect of improving the crystallinity are combined. These undercoating layers can also be formed by modifying the surface of the substrate by, e.g., ion plating, doping in particular gases, or irradiation of neutron beams. These methods are preferable in the manufacture of the medium since they involve no thin film formation step.

The magnetic recording medium of the present invention can further have an interfacial region between the magnetic metal grains and the nonmagnetic matrix. This interfacial region has a function of efficiently coupling the magnetic metal grains and the nonmagnetic matrix or a function of preventing mutual diffusion of the constituent elements of the magnetic metal grains and the nonmagnetic matrix. The interfacial region may contain elements constituting one of the magnetic metal grains and the nonmagnetic matrix as the main constituents, or may contain almost none of these elements. The former case is favorable in that the magnetic metal grains and the nonmagnetic matrix are mechanically strongly coupled. The latter case is favorable in that the magnetic metal grains are magnetically perfectly isolated in the nonmagnetic matrix.

The magnetic thin film of the present invention is formed by depositing a magnetic metal material and a nonmagnetic material on the substrate in a vacuum by using physical vapor deposition or chemical vapor deposition. Examples of the physical vapor deposition are as follows:

(a) Simultaneous sputtering which uses a target of a magnetic metal material and a target of a nonmagnetic material.

(b) Simultaneous sputtering which uses plural targets in an inert gas containing oxygen, nitrogen, or carbon.

In these methods the nonmagnetic matrix made from a compound of some metals and oxygen, nitrogen, or carbon is formed. Note that in the methods (a) and (b), the materials of the magnetic metal grains and the nonmagnetic matrix can be supplied from either separated targets or composite targets. The former has the advantage that it is easy to adjust changes in the magnetic characteristics and the mechanical characteristics with time. The latter has the advantage of being suitable for mass-production.

It is known that the crystal generally grows in the form of a column in these thin film formation methods. Therefore, both the magnetic metal grains and the nonmagnetic matrix can be grown into a columnar shape by properly selecting the process parameters, such as the input power, the sputtering pressure, the reactive gas, the film growth rate, the bias sing power, and the material of additive. Also, in the thin film formation using sputtering in general, a magnetic metal easily grows into a columnar shape and a dielectric thin film is readily become amorphous. This demonstrates that by simultaneously growing a magnetic metal and a dielectric material by using the sputtering process, it is possible to obtain a magnetic thin film in which columnar magnetic metal grains with a large shape magnetic anisotropy are mixed in a nonmagnetic amorphous matrix made from a dielectric substance.

In this case if the magnetic metal grains grow into long columns the shape magnetic anisotropy of the magnetic metal grains is given in the direction of film thickness of the magnetic thin film. Depending on the growth condition of the crystal, the columnar crystal grains sometimes grow such that their long axes point in the in-plane direction. In such a case, the shape magnetic anisotropy is given in the in-plane direction. The direction of the magneto-crystalline is determined in accordance with whether the crystallographic axis points in the film thickness direction or the in-plane direction. This can be controlled by the condition of the crystal growth. The process parameters for controlling the crystal growth condition are, as described above, the input power, the sputtering pressure, the reactive gas, the film growth rate, the bias sing power, and the material of additive. In addition to these parameters, the condition of the substrate and the condition of the undercoating film, e.g., the crystal orientation and the surface energy also have effects on the magnetic anisotropy. Therefore, a predetermined magnetic anisotropy can also be obtained by properly choosing these parameters.

Examples of the chemical vapor deposition are MOCVD, plasma CVD, and multi-target simultaneous vapor deposition. In any of these methods, annealing of the materials deposited on the substrate is also possible, where necessary, in order to precipitate the magnetic metal grains in the nonmagnetic matrix.

In the formation of the magnetic thin film on the substrate, short circuits to a magnetic head can be more perfectly prevented by decreasing the ratio of the magnetic metal grains to the nonmagnetic matrix on the surface of the medium and increasing that ratio on the interface to the substrate. On the other hand, the medium magnetic field strength can be improved by increasing that ratio on the medium surface and decreasing that ratio on the substrate interface. Note that ratio or the distribution of the magnetic metal grains in the nonmagnetic matrix can be controlled by the film growth conditions, e.g., the input power ratio of the target of the magnetic metal material to the target of the nonmagnetic material.

The magnetic recording medium of the present invention has the following features which none of the conventional magnetic recording media can achieve.

(1) Elimination of spacing loss from protective layer

Since in the magnetic recording medium of the present invention the nonmagnetic matrix is made from a high-hardness material, the magnetic thin film has a sufficient mechanical strength. This obviates the need for a protective film which is essential in the conventional magnetic recording media. The spacing, which is the distance between a recording/reproduction head and the magnetic thin film, is unavoidably equal to or larger than the thickness of the protective film in the conventional magnetic recording media. However, this limitation is completely eliminated in the magnetic recording medium of the present invention. This means that high-density recording which is conventionally impossible can be performed by decreasing the spacing. If the recording density need only be equivalent to the conventional ones, this also means that the flying height of the recording-reproduction head can be increased, and thereby the probability of damages to the head or the medium can be greatly decreased. Additionally, since no protective film formation step is necessary, the production yield of the medium is increased, and this decreases the manufacturing cost of the medium. Note that in some instances the magnetic thin film does not have an enough hardness to withstand operations with no protective film formed or is used in applications, such as a contact operation, which even a conventional medium with a protective film cannot withstand. If this is the case a protective film can be formed on the magnetic thin film of the present invention. Even in this case the protective film can be readily formed since the hardness of the magnetic thin film is higher than those of conventional metal thin films.

(2) Reduction in medium noise

In the magnetic recording medium of the present invention, the nonmagnetic matrix is present between the individual magnetic metal grains, so the distance between the magnetic metal grains is larger than the distance the exchange coupling interaction has its effect. Consequently, the medium noise can be reduced.

Information recording is done by forming reversed magnetic domains on the magnetic recording medium, and these reversed magnetic domains are constituted by crystal grains of the magnetic thin film. In each crystal grain the spins of individual atoms point in the same direction and are reversed almost simultaneously by the magnetic field from the head. Therefore, the roughness of the boundaries between the reversed magnetic domains is ideally about the same size of the crystal grains, and this boundary roughness causes recording noise produced by information recording. Generally, in the magnetic thin film a nonmagnetic substance such as an oxide is present between the crystal grains of a magnetic substance. If the distance between the crystal grains is short to result in insufficient magnetic insulation, the exchange coupling interaction occurs between the crystal grains. If one crystal grain is magnetically reversed in this condition, the adjoining crystal grains also are magnetically reversed by the exchange coupling interaction. The result is that the magnetization reversal is done in units of several crystal grains. This further roughens the boundaries between the reversed magnetic domains, resulting in large medium noise taking place. All conventional magnetic recording media suffer from this problem, so additions of various additives to the medium materials have been attempted. By convention, however, the interaction between the crystal grains cannot be perfectly insulated. Although the crystal grains can be separated by a distance of about 1 nm to date, the magnetic insulation is imperfect due to, e.g., diffusion of magnetic elements. As a consequence, medium noise of a few dB to a few tens of dB occurs. On the other hand, the magnetic recording medium of the present invention has no such problem. That is, the exchange coupling interaction is extremely small because the magnetic crystal grains are perfectly insulated by the nonmagnetic matrix.

(3) Controllability of resistivity of medium

The resistivity of the magnetic recording medium is a problem when a high-sensitivity magnetoresistance (MR) head is used. That is, if destruction of the recording/ reproduction elements or the medium caused by discharge between the medium and the head is a problem, the magnetic recording medium preferably has a electrical conductivity. Also, if destruction of the MR elements or a reduction in the signal intensity caused by a leakage current to the medium is a problem, the magnetic recording medium is preferably insulating.

In the conventional magnetic recording media an insulating protective film is formed on a metal thin film, so it is not possible to control the electrical resistivity of the whole magnetic recording medium without impairing the magnetic characteristics or the protection performance. However, the magnetic recording medium of the present invention is a mixture of magnetic metal grains and a nonmagnetic matrix. Consequently, the electrical resistivity can be controlled by, e.g., the mixing ratio of the two materials or the material or amount of additive.

As a method by which the above problem of the conventional metal thin-film media is solved, a magnetic thin film in which fine magnetic metal grains are dispersed in a dielectric substance has been proposed (U.S. Pat. No. 4,973, 525). Unfortunately, U.S. Pat. No. 4,973,525 only describes that this magnetic thin film needs to be formed by sputtering on a substrate heated to 700 to 800K in order to obtain magnetic characteristics usable as a magnetic recording medium. That is, U.S. Pat. No. 4,973,525 does not mention how to obtain a large magnetic anisotropy energy. In particular, Fe fine grains exemplified as an embodiment are known to be a material having a considerably small magneto-crystalline anisotropy energy, and the shape of the grains is also nearly a sphere. Therefore, it is difficult for the Fe fine grains to obtain the coercive force required of the magnetic recording medium. Although the embodiment describes that a coercive force of about 1 kOe was obtained, it is considered that this coercive force was induced by stress resulting from a heat treatment or the like processing. If this is the case, peeling of the film caused by the stress can be of a problem, and the heat-treatment temperature of 700 to 800K can damage the substrate. In contrast, in the magnetic recording medium of the present invention the magnetic metal grains have both shape magnetic anisotropy and magneto-crystalline. This makes it possible to obtain a large coercive force. Also, no damage is given to the substrate since no heat treatment is necessary.

Embodiments of the magnetic recording medium of the present invention will be described below with reference to FIGS. 1 and 2.

Referring to FIG. 1, a magnetic thin film is formed on a glass substrate 11. This magnetic thin film consists of magnetic metal grains 1 having shape magnetic anisotropy and magneto-crystalline and a nonmagnetic matrix 2 continuously present in the direction of film thickness and the in-plane direction.

Figure 2:
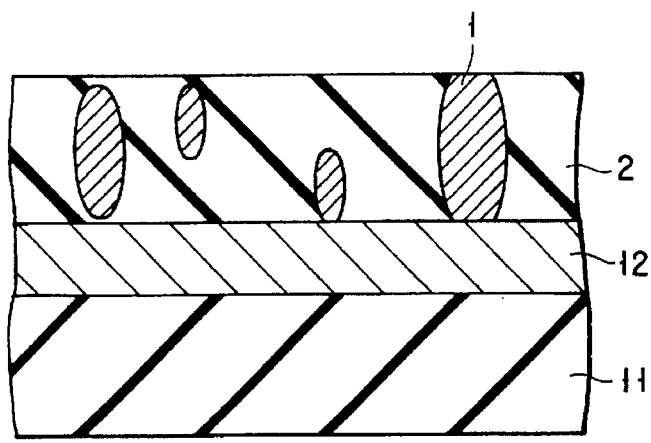

Referring to FIG. 2, an undercoating layer 12 is formed on the glass substrate 11, and the magnetic thin film consisting of the magnetic metal grains 1 having shape magnetic anisotropy and magneto-crystalline and the nonmagnetic matrix 2 continuously present in the direction of film thickness and the in-plane direction is formed on top of the undercoating layer 12. In this structure it is desirable that the thickness of the magnetic thin film be 100 nm or less, preferably 50 nm or less, and more preferably 20 nm or less. This is because if the thickness of the magnetic thin film is too large, the film growth time is prolonged, and strains caused by the stress which make the film easy to peel. Note that in performing longitudinal recording, the smaller the film thickness the higher the density of the recording.

The magnetic thin film constituting the magnetic recording medium of the present invention can be regarded as a composite material of the magnetic metal grains and the nonmagnetic matrix. When this magnetic thin film is expressed in accordance with the definition of connectivity of the composite material, the film can be esteemed as a so-called "3-1 connection" or "3-2 connection" since the nonmagnetic matrix spreads three-dimensionally and the magnetic metal grains are in a two-dimensional or one-dimensional connected state. No such connected state is known in the conventional magnetic recording media.

In the magnetic recording medium of the present invention, the network structure of the nonmagnetic matrix can be confirmed by dissolving only the magnetic metal grains by dipping the magnetic thin film into, e.g., an acid. If the nonmagnetic matrix remains on the substrate while maintaining the original magnetic thin-film shape even after the magnetic metal grains are removed, it may be assessed that the magnetic thin film itself well satisfies the necessary conditions for the durability.

The magnetic recording medium of the present invention has a structure in which the magnetic metal grains and the nonmagnetic matrix are present in a phase-separated state. From a microscopic viewpoint, however, during or after the thin film formation the diffusion of the atoms constituting the magnetic metal grains and the atoms constituting the nonmagnetic matrix may take place. Accordingly, it is hard to form a composite film in which the magnetic metal grains and the nonmagnetic matrix are completely separated on the atomic level. To obtain the above-mentioned advantages brought about by the structure in which the magnetic metal grains and the nonmagnetic matrix are separated, therefore, it is necessary that the content of the magnetic elements constituting the magnetic metal grains be 20 atomic % or less, or the content of the elements constituting the nonmagnetic matrix be 20 atomic % or less in a central portion between the magnetic grains in the nonmagnetic matrix (central portion).

Figure 3:
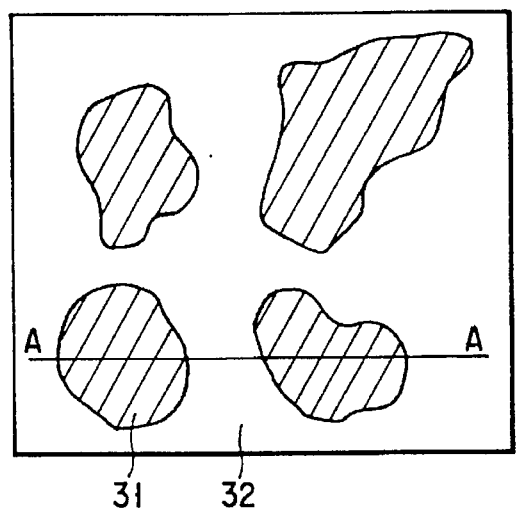
FIGS. 3 and 5 are views showing plan images of the magnetic recording media observed with a transmission electron microscope.

A central portion of the magnetic metal grain and the central portion between the magnetic metal grains in the nonmagnetic matrix will be described below. FIG. 3 is a view showing a plane image of a fine grain dispersed thin film observed with a transmission electron microscope (TEM), when CoPt grains are used as the magnetic metal grains and Si—O is used as the material of the nonmagnetic matrix. In FIG. 3, reference numeral 31 denotes magnetic metal grain portions primarily consisting of CoPt; and 32, a nonmagnetic matrix portion primarily consisting of Si—O. In this plane TEM image, these portions can be clearly distinguished by, e.g., a discontinuous portion of the crystal lattice or a discontinuity of the contrast of the image.

Figure 4:
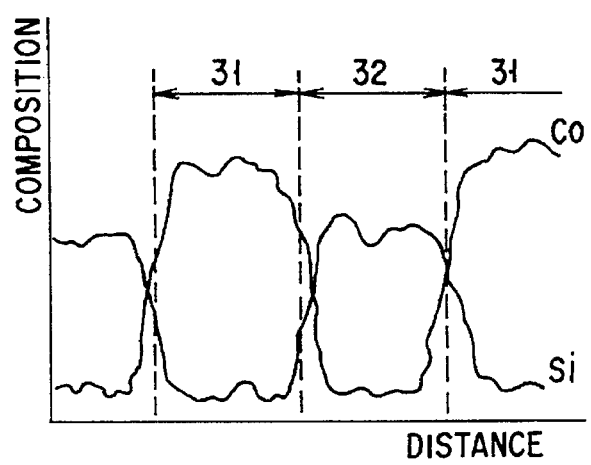
FIG. 4 is a graph showing the composition distributions taken along the line A—A in FIG. 3.

FIG. 4 is a graph showing the composition distributions of Si and Co taken along the line A—A in FIG. 3. This fine composition analysis can be attained by electron diffraction simultaneously with the image shown in FIG. 3. FIG. 4 also shows the boundaries between the magnetic metal grain portions 31 and the nonmagnetic matrix portion 32 determined from FIG. 3. In the magnetic recording medium of the present invention, the central portion between the magnetic metal grains in the nonmagnetic matrix is an 80% region in the center of the nonmagnetic matrix portion 32 between the magnetic metal grain portions 31 in FIG. 4. Also, the central portion of the magnetic metal grain is an 80% region in the center of the magnetic metal grain portion 31 in FIG. 4. This region changes its area in accordance with the way the line A—A is chosen on the plan TEM image. Therefore, the region is determined by averaging the values obtained by performing the above analysis a plurality of number of times. Accordingly, the dispersion degree of the magnetic metal grains and the nonmagnetic matrix is evaluated on the basis of the analytical average value.

Figure 5:
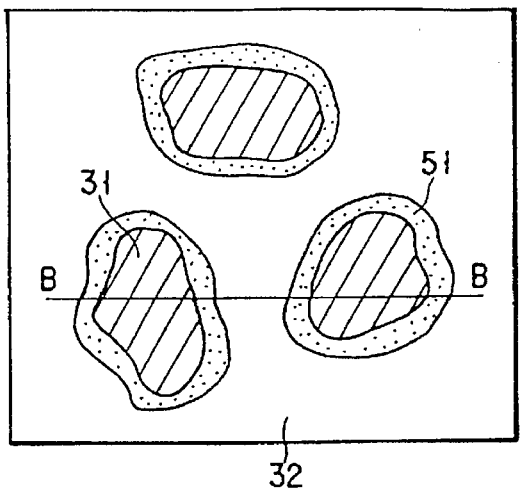
Figure 6:
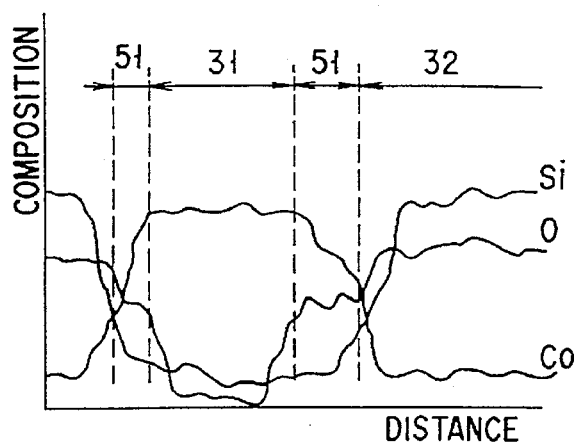
FIG. 6 is a graph showing the composition distributions taken along the line B—B in FIG. 5.

FIG. 5 is a view showing a plan TEM image when the same composition as in FIG. 3 is used and an interface region is formed between the magnetic metal grains and the nonmagnetic matrix. In FIG. 5, reference numeral 31 denotes magnetic metal grain portions primarily consisting of CoPt; 32, a nonmagnetic matrix portion primarily consisting of Si—O; and 51, an interface region made from amorphous CoO. As in FIG. 3, these portions can be clearly distinguished on the plan TEM image. FIG. 6 is a graph showing the results of composition analysis taken along the line B—B in FIG. 5. In FIG. 6, the central portion of the magnetic metal grain is an 80% region in the center of the region 31. The central portion between the magnetic metal grains in the nonmagnetic matrix is an 80% region in the center of the region 32 between the regions 31.

Figure 7:
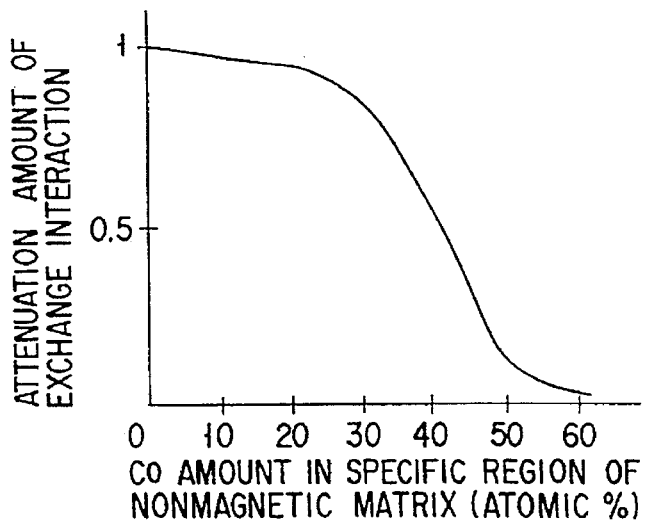
FIG. 7 is a graph showing the relationship between the Co amount in a central portion between magnetic metal grains and the attenuation amount of an exchange interaction in a nonmagnetic matrix of the magnetic recording medium of the present invention.

The magnetic metal atoms in the nonmagnetic matrix have an effect of enhancing the exchange coupling interaction between the magnetic metal grains. FIG. 7 shows the attenuation of the exchange coupling interaction as a function of the magnetic element (Co) amount in the central portion of the nonmagnetic matrix in the example shown in FIG. 3. FIG. 7 plots the relative value assuming the attenuation amount of the exchange interaction is 1 when the nonmagnetic matrix is formed between two magnetic metal grains and the Co amount is 0 atomic %. As can be seen from FIG. 7, the attenuation amounts are 0.99, 0.97, and 0.95 when the Co amounts are 5, 10, and 20 atomic %, respectively, and almost no attenuation is found when the Co amount is 50 atomic %. This indicates that the permissible concentration of the magnetic element in the central portion of the nonmagnetic matrix is 20 atomic % or less, preferably 10 atomic % or less, and more preferably 5 atomic % or less.

At a concentration larger than 20 atomic %, diffusion of the constituent element between the magnetic metal grains and the nonmagnetic matrix (e.g., diffusion of the oxygen atoms from the nonmagnetic matrix into the magnetic metal grains) readily occurs, leading to degradation in the magnetic characteristics of the whole magnetic thin film.

Figure 8:
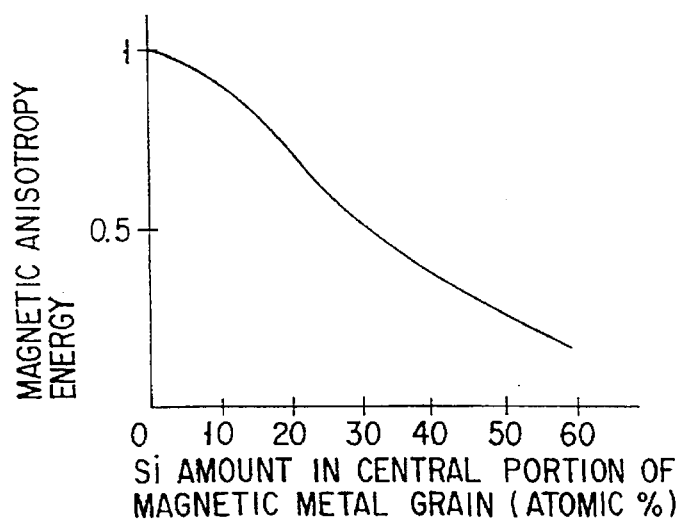
FIG. 8 is a graph showing the relationship between the Si amount in the central portion between the magnetic metal grains and the magnetic anisotropy energy in the nonmagnetic matrix of the magnetic recording medium of the present invention.

FIG. 8 shows a change in the magnetic anisotropy energy as a function of the Si amount in the central portion of the magnetic metal grain in the example shown in FIG. 3. FIG. 8 plots the relative value assuming the value when the Si amount is 0 atomic % is 1. It is evident from FIG. 8 that the magnetic anisotropic energies are 0.95, 0.90, and 0.80 when the Si amounts are 5, 10, 20 atomic %, respectively, and the magnetic characteristics as the magnetic recording medium cannot be maintained when the Si amount is 20 atomic % or more, since it is no longer possible to utilize the full magnetic anisotropy energy of CoPt. From the foregoing, the permissible concentration of the constituent element of the nonmagnetic matrix in the central portion of the magnetic metal grain is 20 atomic % or less, preferably 10 atomic % or less, and more preferably 5 atomic % or less. Concentrations larger than 20 atomic % readily cause diffusion of the constituent element between the magnetic metal grains and the nonmagnetic matrix, and this leads to degradation in the magnetic characteristics of the whole magnetic thin film.

The element analysis is performed on the surface region. In thin film having a thickness of not more than about 100 nm, however, information from the element analysis on the surface region consists also the information along a depth direction.

In the magnetic recording medium of the present invention, the magnetic metal grains with shape magnetic anisotropy generally have an anisotropic shape except for a sphere. The magnetic metal grains preferably have a rod-like shape, such as a columnar shape or a spheroidal shape, which is long in a direction in which anisotropy is wanted. The shape of the magnetic metal grains will be described in more detail below. Assuming the demagnetizing factor of a magnetic grain having magnetization I and volume $\underline{v}$ is N and the magnetic permeability in a vacuum is $\mu_0$, the magnetostatic energy in the direction of N is given by $$U = \tfrac{1}{2}\mu_0 \cdot N \cdot I^2 \cdot v$$

If the magnetic grain is symmetrical about the z axis, the demagnetizing factors $N_x$, $N_y$, and $N_z$ in the directions of $\underline{x}$, $\underline{y}$, and $\underline{z}$ axes satisfy $$N_x = N_y = (1 - N_z)/2$$

Assuming the shape of the magnetic grain is a spheroid, the magnetostatic energy U when the saturation magnetization, Is, is inclined at an angle $\theta$ from the $\underline{z}$ axis is $$U = \tfrac{1}{4}\mu_0 \cdot I_s^2 \cdot v \cdot (3N_z - 1) \cos^2\theta + \text{const.}$$

This equation shows that the magnitude of the shape magnetic anisotropy energy is directly proportional to $(1 - 3N_z)$. Also, the shape magnetic anisotropy is a maximum when $N_z = 0$, and is a minimum when $N_z = \frac{1}{3}$. Assuming that (the length of the long axis)/(the length of the short axis) of a spheroid which is long along the $\underline{z}$ axis is $\underline{r}$, the relationship between $\underline{r}$ and $(1 - 3N_z)$ is such that $(1 - 3N_z)$ is 0, 0.30, 0.48, 0.67, 0.83, and 0.94 for r=1, 1.5, 2, 3, 5, and 10, respectively. This shows that nearly 30% of the maximum shape magnetic anisotropy can be obtained when $\underline{r}$ is 1.5 or larger, and nearly 70% of the maximum shape magnetic anisotropy can be obtained when $\underline{r}$ is 3 or larger. Also, an almost identical relationship holds for a magnetic metal grain having a shape other than a spheroid, provided that the shape is like a long rod.

The conditions which the magnetic thin film must satisfy to realize high-density recording when the magnetic recording medium of the present invention is used will be described below. Of the physical properties of the magnetic thin film, the packing ratio and the electrical resistivity will be described.

(1) Packing ratio

The packing ratio of the magnetic metal grains to the nonmagnetic matrix has a serious effect on, e.g., the hardness and the magnetic characteristics of the magnetic thin film. Assuming that the magnetic metal grains have a columnar shape and the arrangement of the grains viewed from the bottom of column is hcp, the packing ratio, $p$, is represented by $$p = 2\pi a^2 / (\sqrt{3} \cdot (2a+b)^2)$$

by using the radius, $a$, of the grain column and the spacing, $b$, between the grains. It is known that the grain size of the magnetic metal grains of a typical thin-film magnetic recording medium currently being used is approximately 40 nm, and that the distance required to isolate the exchange interaction between the magnetic metal grains is at least about 1 nm. When these values are substituted into the above equation, $p$ is 0.7 or less. It is also apparent that the degree of division of the magnetic interaction between the magnetic metal grains can be controlled by the packing ratio of the magnetic metal grains. To perform recording at a higher density, the packing ratio is preferably 0.5 or smaller. However, the packing ratio is merely one index, and the optimum value of $p$ is determined in accordance with the specifications of a magnetic disc drive system. Additionally, in the magnetic recording medium of the magnetic recording/reproduction apparatus of the present invention, the magnetic metal grains can be considered as an impurity in the nonmagnetic matrix. Therefore, the internal stress of the magnetic thin film can be controlled by the packing ratio. Note that even if the arrangement of the magnetic metal grains viewed from the bottom is, for example, fcc, other than hcp, the exchange interaction between the magnetic metal grains can be effectively isolated with a packing ratio of 0.7 or smaller for the same reasons as above. As discussed above, the average value of the packing ratio all over the magnetic thin film can be controlled. However, it is also possible to improve the various characteristics by changing the packing ratio along the direction of film thickness of the magnetic thin film. The lower limit of the packing ratio is not restricted, but preferably the packing ratio is not less than 0.05.

As an example, when the packing ratio is so changed that portions with a high packing ratio and portions with a low packing ratio alternately appear in the direction of thickness of the magnetic thin film, the stress can be concentrated to local portions little by little, and this reduces the internal stress as a whole. When the internal stress of the magnetic thin film is reduced, the adhesion of the magnetic thin film to the substrate is improved. Consequently, the durability and the lifetime of the magnetic recording medium are improved, and defects of the magnetic thin film which cause burst noise can be reduced. Note that this way of changing the packing ratio is merely an example. Since the value of the internal stress varies in accordance with the film growth conditions of the magnetic thin film, a proper change need only be made according to each individual case.

Additionally, when the packing ratio is changed so as to decrease from the substrate surface toward the surface of the magnetic thin film, the hardness of the surface of the magnetic recording medium is increased. Consequently, the durability of the magnetic recording medium with respect to, e.g., head crush, can be improved. Since in this case the magnetic recording medium has a sufficient durability even if recording is done by driving the head in contact with the medium, it is possible to realize a very high density magnetic recording medium.

When, in contrast, the packing ratio is so changed as to increase from the substrate surface toward to the surface of the magnetic thin film, the magnetization on the surface of the magnetic thin film increases, resulting in a large reproduced output. If the materials of the substrate and the nonmagnetic matrix are similar and hence the mechanical characteristics such as the expansion coefficients of the two also are similar, the difference between the mechanical characteristics of the substrate and the magnetic thin film in the interface is small. The result is an improved adhesion between the two.

Furthermore, in performing recording by bringing the magnetic thin film and the magnetic head into contact with each other, a high hardness and good electrical insulating properties on the surface of the magnetic thin film also are important factors. Accordingly, the ratio of the magnetic metal grains on the surface of the magnetic thin film is one important parameter. On the surface of the magnetic thin film, the value of (the area of the magnetic metal grains)/(the area of the nonmagnetic matrix) is preferably 0.7 or less, and more preferably 0.5 or less, as is the case with the packing ratio of the magnetic metal grains. In practice, the ratio of not less than 0.05 suffices for above recording.

(2) Electrical resistivity

In the magnetic recording medium of the present invention, if an insulator is used as the nonmagnetic matrix the electrical resistivity of the magnetic thin film can be controlled by the packing ratio of the magnetic metal grains. Also, the electrical resistivity of the whole thin film can be controlled by adding some element to the nonmagnetic matrix. For example, if the electrical resistivity of the magnetic thin film is 1 $\Omega$.cm or higher, the film can be well considered as an insulator compared to the conductor portion of the head. Even if an MR head is used, therefore, it is possible to prevent destruction of the head caused by a leak of current to the medium upon contact. When the conductor portion of the head is formed into a microstructure as in the case of the MR head, the resistance in that portion is increased. If this is the case, the electrical resistivity of the magnetic thin film is preferably $10^5$ $\Omega$.cm or higher, and more preferably $10^{10}$ $\Omega$.cm or higher in order to keep perfect electrical insulating properties.

It is known that when a disk-like medium made of a magnetic thin film formed on a glass substrate is rotated at a high speed, a charge is produced on the disk due to the friction with air. If the charge built up on the disk is discharged to a magnetic head, the head elements may be destroyed. Even when the amount of the built-up charge is small, if the volume of the conductor portion of the magnetic head is small, a large current flows through that portion. Therefore, as the integration of the head elements is increased, this charge built up on the disk becomes more and more troublesome. In situations where the charge is more troublesome than the insulating properties discussed above, it is preferable to give conductivity to a certain degree to the medium. However, a perfect conductor is unpreferable since a leakage current occurs from the head elements. More specifically, the electrical resistivity is preferably $10^{-4}$ to $10^5$ Ω.cm. Note that the insulating properties and the electrical conductivity to a certain degree are chosen in accordance with the system environment such as the head and the magnetic disk drive used. Indium tin oxide (ITO) is known as a base material which realizes an electrical resistivity of $10^{-4}$ Ω.cm or higher. Also, nitrides of transition metals, such as TiN, TaN, and TiC, are known as base materials which realize an electrical resistivity of $10^{-2}$ Ω.cm or higher. To realize a higher electrical resistivity, it is only necessary to use a common dielectric material, e.g., Si—O, AlN, or BN.

It is preferable that on a magnetic disk drive system, the above requirements for the electrical resistivity of the medium be met between the medium substrate or the spindle and any conductive portion in the head while the head is in contact with the medium. As an example, for the purpose of preventing destruction of the head elements caused by static electricity, it is only necessary to set the electrical resistivity at 1 Ω.cm or higher between the medium substrate or the spindle and any conductive portion in the head while the head is in contact with the medium. In that case no damage is given to the head regardless of the operating conditions. Analogously, to prevent a leakage current from the head elements, it is preferable to set the electrical resistivity at $10^{-4}$ Ω.cm or higher between the medium substrate or the spindle and any conductive portion in the head while the head is in contact with the medium.

(3) Magnetic characteristics of whole magnetic thin film

To make the magnetic recording medium of the present invention capable of high-density magnetic recording of 1 Gb/in$^2$ or more, a high coercive force Hc is necessary in order to stably maintain fine magnetic domains. More specifically, Hc of 2 kOe or higher is preferable. Furthermore, Hc of 3 kOe or higher is preferable to achieve a recording density on the order of 10 Gb/in$^2$. When the head-medium interaction is taken into consideration, Hc of the magnetic recording medium has a close relationship with the saturation flux density, Bs, of the magnetic recording head.

Figure 9:
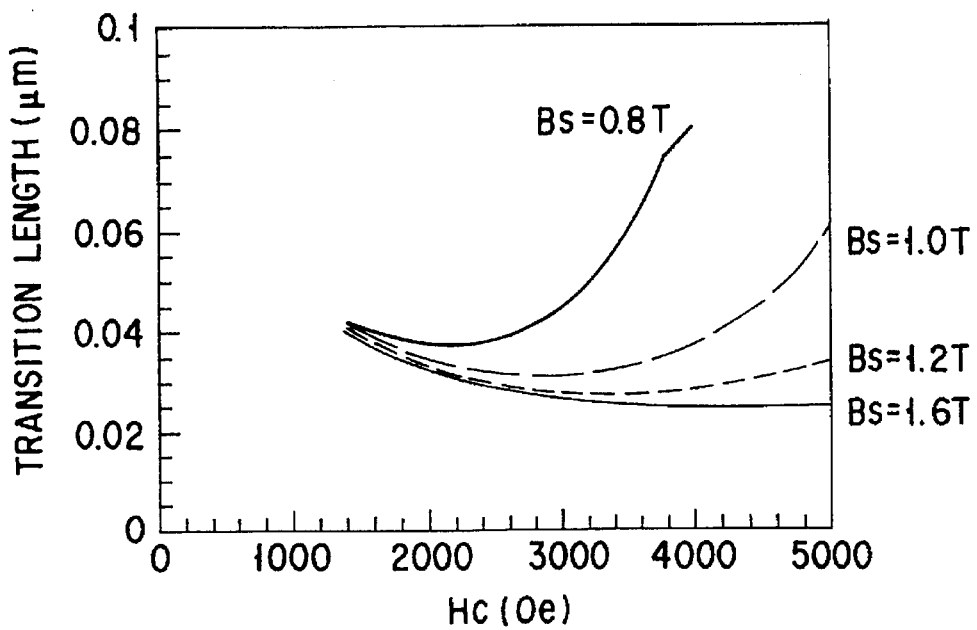
FIG. 9 is a graph showing the relationship between the saturation flux density in a magnetic pole of a recording head and the coercive force of the magnetic recording medium.

FIG. 9 shows the relationship between Bs, the transition length, and the coercive force Hc obtained by a computer simulation when the recording track width is 3 μm, the gap length is 0.25 μm, and the spacing is 0.06 μm. The minimum value on each curve in FIG. 9 is the condition by which the minimum domain width recordable by the corresponding Bs can be achieved, i.e., by which the highest recording density can be achieved. The minimum value on each curve in FIG. 9 corresponds to the maximum Hc required to achieve the highest recording density for the corresponding Bs. That is, 2200 Oe for Bs=0.8T, 2800 Oe for Bs=1.0T, 3500 Oe for Bs=1.2T, and 4500 Oe for Bs=1.6T. From this result, Hc of the magnetic recording medium is preferably ½ or less, and more preferably ¼ or less of the Bs of the head in a CGS unit system.

(4) Mechanical structure of surface of magnetic thin film

To protect the magnetic recording medium of the present invention, the medium can be coated with a lubricant used in the conventional magnetic recording media. In the magnetic thin film of the present invention, coating of a lubricant has the advantage of improving the adhesion since the lubricant is buried in voids present in the nonmagnetic matrix or in the interface portion between the nonmagnetic matrix and the magnetic metal grains. Also, to positively bury voids with a lubricant, it is possible to selectively form voids in the nonmagnetic matrix or in the interface portion between the nonmagnetic matrix and the magnetic metal grains by polishing the medium after the manufacture. To achieve a sufficient adhesion, each void preferably has a radius of 1 nm or more and a depth of 2 nm or more.

The various physical properties which the magnetic metal grains must satisfy in order to realize high-density recording when the magnetic recording medium of the present invention is used will be described below.

(5) Volume of magnetic metal grain

It is generally known that when a magnetic substance is very small, it is no longer possible to align the magnetizations in a certain fixed direction due to thermal fluctuation. A change in magnetization I with time, caused by thermal fluctuation, of a magnetic substance having magnetic anisotropy energy Ku and volume $\underline{v}$ is represented by $$I(t)=Is \cdot \exp(-t/\tau)$$

where $\underline{t}$ is time, Is is the initial magnetization, and τ is represented by $$\tau=\tau_0 \cdot \exp(v \cdot Ku/kT)$$

where $\tau_0$ is approximately $10^{-9}$, k is the Boltzmann constant, and T is the absolute temperature. From this equation, the condition by which τ satisfies a practical recording holding time of 10 years at room temperature (T=300K) is $v \cdot Ku < 1.7 \times 10^{-19}$. In the case of SmCo, $v=1.8 \times 10^{-26}$ m$^3$ is obtained by substituting $9.5 \times 10^6$ J/m$^3$ into Ku. Therefore, a magnetic metal grain having a volume equal to or larger than this value can be favorably used as the magnetic recording medium, since the magnetization is not lost by thermal fluctuation.

(6) Size of magnetic clusters

Magnetic domains are formed on the magnetic thin film by the magnetic field from a magnetic head and used as units of information recording. If the minimum domain size of the magnetic thin film is larger than magnetic domains to be formed, the S/N ratio of a signal is degraded, and reproduction becomes impossible in the worst case. The minimum domain size can be estimated by the magnetic cluster size when the magnetic recording medium is AC-demagnetized. It is known that the length in the linear direction of a recording magnetic domain which achieves a recording density of 1 GB/in$^2$ is 150 nm (Murdock: IEEE Trans. Magn., Vol. 28, p. 3078, 1992). Therefore, by decreasing the average magnetic cluster size to be smaller than this value, high-density recording of 1 GB/in$^2$ or higher is possible. However, in practice the noise level is increased unless several magnetic clusters are included in the short side of a magnetic domain. Consequently, the magnetic cluster size is preferably 100 nm or smaller, and more preferably 50 nm or smaller. To effectuate reproduction with a high S/N ratio, it is preferable that the magnetic cluster size be 30 nm or smaller.

(7) Grain size of magnetic metal grains

If the size of the magnetic metal grains is equivalent to or larger than the size of the magnetic clusters when the magnetic recording medium is AC-demagnetized, the shape of the magnetic domains formed on the magnetic recording medium cannot reflect the magnetic field from the head, giving rise to recording noise. This noise can be reduced if the average grain size of the magnetic metal grains in the in-plane direction is ¹⁄₁₀ or less the average size of the magnetic clusters when AC demagnetization is done. The average grain size of the magnetic metal grains in the in-plane direction can be calculated only by observing the surface of the magnetic thin film with a microscope, measuring the sizes of a plurality of magnetic metal grains, and averaging out the measured sizes. The magnetic metal grains observed from the surface of the magnetic thin film have a long rod-like shape in some cases. If this is the case, one or more straight lines are drawn on the micrograph of the film surface, and the total length the straight lines cross the magnetic metal grains is averaged out by the number of magnetic metal grains which the straight lines cross. In this way the average grain size of the magnetic metal grains in the in-plane direction is calculated. Also, if the shape of the magnetic metal grains observed from the surface of the magnetic thin film is a spheroid, it is possible to calculate the average grain size of the magnetic metal grains in the in-plane direction by averaging out the lengths of the long and short axes of these grains.

In the magnetic thin film of the present invention, the magnetic metal grains are separated to a degree at which no exchange interaction takes place, so these magnetic metal grains are the minimum units of magnetization reversal. Consequently, the recording noise can be reduced by the magnetic metal grains with the preferable size as discussed above. Considering the relationship between the crystal grains and the magnetic clusters in the conventional metal thin-film type magnetic recording media is meaningless, since one crystal grain is not the minimum unit of magnetization reversal in these media.

(8) Standard deviation of spacings between magnetic metal grains

As discussed previously, it is said that the distance between the magnetic metal grains needs to be approximately 1 nm or larger in order to isolate the magnetic interaction between the magnetic metal grains to thereby permit high-density magnetic recording. Also, a large variation in the distances makes it impossible to obtain a uniform coercive force all over the magnetic thin film, with the result that the shape of the recording magnetic domains is deformed to increase the noise. To prevent this, the standard deviation of the spacings between the magnetic metal grains is preferably 1 nm or smaller. To realize recording of a higher density, the standard deviation is preferably 0.5 nm or smaller.

The magnetic head of the magnetic recording/reproduction apparatus of the present invention will be described in detail below.

In the present invention, the magnetic head preferably uses the magnetoresistance effect resulting from spin-dependent scattering. Examples of the magnetoresistance effect resulting from spin-dependent scattering are artificial lattice type, so-called Shinjo type, spin valve type, and granular type magnetoresistance effects. The artificial lattice type magnetoresistance effect shows a great magnetic resistance change, i.e., a maximum of about 100% of the magnetic resistance change, by using a multilayered film formed by stacking ferromagnetic films and nonmagnetic films, such as Fe/Cr or Co/Cu. The ShinJo type magnetoresistance effect exhibits a magnetic resistance change by using two types of films of each different coercive force and making the magnetizations of these two magnetic films antiparallel to each other by the use of the difference in the coercive force. In the spin valve type magnetoresistance effect, the magnetization of one of two magnetic films sandwiching a nonmagnetic film is pinned by using an exchange bias from, e.g., an antiferromagnetic film, and the magnetization of the other magnetic film is rotated by an external magnetic field. The result is that the magnetizing directions of the two magnetic films are made parallel and antiparallel to each other on the two sides of the nonmagnetic film, yielding a large magnetic resistance change. The granular type magnetoresistance effect is a magnetic alloy film in which magnetic grains are dispersed into a nonmagnetic matrix made from Cu, Ag, Au, or the like substance.

In the present invention, in order to prevent short circuits between the magnetic head and the magnetic recording medium, the electrical resistivity between any conductive portion of the magnetic head and the medium substrate or spindle is preferably 0.01 $\Omega \cdot m$ or more while the magnetic head is in contact with the magnetic recording medium.

In addition, in the present invention, the spacing between the head-side magnetic surface of the magnetic recording medium and the tip of the magnetic head is preferably 0.05 μm or less (suitable for a recording density of 1 GB/in$^2$ or more) upon signal reproduction from the medium. This spacing is a narrow spacing which cannot be attained with combinations of the state-of-the-art metal thin-film media and magnetic heads.

In the present invention, the magnetic head using the magnetoresistance effect is preferably a head manufactured by integrating a recording unit and a reproduction unit. The recording unit consists of a coil and magnetic poles electrically insulated by an insulating layer. The recording unit records information on a recording medium in accordance with the current supplied to the coil. The reproduction unit is constituted by electrodes and a magnetic film (MR film) which gives rise to the magnetoresistance effect. Examples of the MR film are a film (AMR) which utilizes an anisotropic magnetoresistance effect in which the resistance changes with a change in the angle between the sense current and the magnetization of the MR film, and a film (GMR) which utilizes a magnetoresistance effect resulting from spin-dependent scattering independent of the direction of the sense current as discussed above.

When the AMR is to be used in the magnetic recording/reproduction apparatus of the present invention, a single-layer NiFe or NiFeCo film is used as the MR layer. On this MR film a film for applying a bias magnetic field (an operating bias for obtaining a linear response or a bias for removing Barkhausen noise) is stacked, if necessary.

On the other hand, when the GMR is to be used in the magnetic recording/reproduction apparatus of the present invention, a magnetic multilayered film in which magnetic and nonmagnetic layers are stacked such that at least two magnetic layers are included, or a magnetic alloy film in which fine magnetic grains are dispersed into a nonmagnetic matrix, is used as the MR film. In the magnetic multilayered film, the resistance lowers when the magnetizations of neighboring magnetic layers lie in the same direction (parallel), and the resistance rises when the magnetizations of neighboring magnetic layers lie in directions different by 180° (antiparallel). A signal magnetic field is reproduced from the magnetic recording medium by using this phenomenon. In the magnetic alloy film, on the other hand, the resistance decreases when the magnetizations of adjoining fine magnetic grains are aligned parallel to each other, and the resistance increases when the magnetizations of adjoining fine magnetic grains are aligned antiparallel to each other. A signal magnetic field is reproduced from the magnetic recording medium by using this phenomenon.

In the GMR using the magnetic multilayered film as the MR film, it is particularly desirable that the signal magnetic field be detected by pinning the magnetization of one of adjacent magnetic layers so that the magnetization is not essentially moved by the magnetic field from the medium, and rotating the magnetization of the other magnetic layer by the signal magnetic field by giving the magnetization a high magnetic permeability. Examples of the method of pinning the magnetization of the magnetic layer are a method by which exchange coupling is brought about by stacking an antiferromagnetic film and a method using a magnetic film with a high coercive force. In this method, while the magnetization pinning direction is substantially made agree with the inflow direction of the medium magnetic field. Alternatively, the magnetization of the magnetic film whose magnetization is rotating is set to be perpendicular to the inflow direction of the medium magnetic field for a signal magnetic field substantially 0 by a method such that, another bias magnetic field is applied in the direction perpendicular to the inflow medium magnetic field, or by using a method of aligning the axes of easy magnetization. As a consequence, a large, stable linear response can be readily obtained even with a small depth (the length of the MR film in a direction perpendicular to the surface of the medium) suitable for increasing the density.

The rate of resistance change when the GMR is used is several times to ten-odd times as large as that when the AMR is used. Therefore, the GMR has the advantage of being able to realize high-sensitivity reproduction even if the magnetic field from the medium is weakened by increasing the ratio of the nonmagnetic matrix for the purpose of, e.g., increasing the durability.

Also, the sensitivity of the magnetic head can be improved by decreasing the depth to be smaller than those of presently used MR heads. When the depth is decreased, the sensitivity of the magnetic head can be improved regardless of whether the AMR or the GMR is used. More specifically, the sensitivity of the magnetic head can be further improved by decreasing the depth to be smaller than the characteristic length, $\lambda$, represented by an equation presented below. Note that in a magnetic recording/reproduction apparatus constituted by the combination of an MR head and a metal thin-film medium, it is desirable that the characteristic length and the depth be substantially equal since the magnetic field of the medium is strong.

$$\lambda = \sqrt{(\mu g t/2)}$$

where $\mu$ is the magnetic permeability of the MR film, $t$ is the thickness of the MR film, and $g$ is the spacing between the shield and the MR film. If the depth is smaller than the characteristic length $\lambda$, problems such as distortion of the reproduced waveform may occur.

The magnetic recording/reproduction apparatus of the present invention aims at effectuating a very high linear recording density with which the shortest wavelength is close to 0.1 μm. The magnetic head is desirably a so-called shield MR head or a so-called dual-target differential MR head. In the shield MR head, an MR film is arranged between two shield films via insulating layers. In the dual-target differential MR head, two MR films are stacked and the spacing between them functions as the spacing $g$ in the shield MR head.

In the present invention, to narrow the effective magnetic spacing or gap between the magnetic recording medium and the magnetic head, it is preferable that the thickness of the protective film formed on the magnetic recording medium be significantly decreased or no protective film be formed on the medium. In particular, to obtain a startling effect it is desirable that no protective film be formed on the ABS surface (the surface opposing the medium) of the magnetic head. In this case, as the bias film for removing Barkhausen noise it is desirable to use a hard film such as a CoPt film or an antiferromagnetic film such as an NiO film or an NiMn film, in place of the FeMn film whose corrosion resistance is low.

Also, in the present invention a protective film can be formed on the magnetic head to improve the reliability. The reliability while the magnetic head is driven is improved by using the same material or similar materials as the material of the protective film of the magnetic head and the material of the nonmagnetic matrix of the magnetic recording medium. On the other hand, attraction between the magnetic head and the magnetic recording medium can be prevented by selecting the materials such that the hardness of the material of the protective film of the magnetic head largely differs from the hardness of the material of the nonmagnetic matrix of the magnetic recording medium.

In the magnetic recording/reproduction apparatus of the present invention, the magnetic recording medium is formed by dispersing the magnetic metal grains in the nonmagnetic matrix which is improved in the lubricating properties and the abrasion resistance and also has a high electrical resistivity. Consequently, the durability of the magnetic recording medium is improved by the nonmagnetic matrix, and the electrical resistivity of the magnetic recording medium as a whole can be increased even with the use of the fine metal grains. The result is that the reliability of driving between the magnetic head and the magnetic recording medium can be improved without significantly decreasing the thickness of the protective film formed on the magnetic recording medium or without forming any protective film. In addition, even if a signal magnetic field is reproduced by using the MR head which flows a current as the magnetic head, short circuits between the magnetic recording medium and the magnetic head can be prevented.

Also, the magnetic recording medium of the present invention has the problem that the signal magnetic field from the magnetic recording medium is weakened compared to the case in which a metal thin-film medium is used. However, this problem can be solved by the use of the MR head capable of high-sensitivity reproduction even with a weak magnetic field. Furthermore, in the magnetic recording medium of the present invention the magnetic metal grains are isolated by the nonmagnetic matrix so that no exchange interaction occurs between them. Consequently, it is possible to suppress noise of the magnetic recording medium which is the major cause of a low S/N in the MR head. It is also possible to improve the coercive force of the magnetic recording medium.

Moreover, the strength of the signal magnetic field from the magnetic recording medium of the present invention is high, since the medium makes use of magnetic metal grains having a larger saturation magnetization than that of a magnetic recording medium using Ba ferrite which necessitates no protective film. Additionally, the use of the MR head as the magnetic head can realize high-sensitivity reproduction meeting narrow tracks (up to 1 μm). Therefore, by significantly decreasing the thickness of the protective film formed on the magnetic recording medium or forming no protective film on the medium, it is possible to achieve a narrowing of the effective magnetic spacing between the magnetic head and the magnetic recording medium, which is suitable for reproduction at a high linear recording density. Consequently, a magnetic recording/reproduction apparatus with a high recording density can be provided.

Note that even when the MR head is used as the magnetic head, if the ratio of the nonmagnetic matrix is increased too much in order to improve the durability, it is in some cases impossible to keep a high S/N ratio since the reproduced output is lowered. The reproduced output, $\Delta V$, of the MR head can be represented by $$\Delta V = i \times (B/Bs) \times \Delta R$$
$$= i \times (B/Bs) \times (\Delta \rho/\rho) \times R_{suq.} \times (w/d)$$

where $i$ is the sense current, $\Delta R$ is the resistance change, $\Delta \rho/\rho$ is the resistance change rate of the film, $R_{suq.}$ is the sheet resistance of the MR film, $\underline{w}$ is the track width, $\underline{d}$ is the depth of the element width of the MR film, and B/Bs is the magnetization rotation amount. In the MR head the limit by which the sense current can be flowed is determined by the generated heat. Accordingly, the sense current value is so determined that the power ($i^2R$) is held constant. As a result, the above equation is rewritten as follows:

$$\Delta V \sim (B/Bs) \times (\Delta \rho/\rho) \times z, 900 \{R_{suq.} \times (w/d)\}$$

B/Bs in this expression is determined by the strength of the medium magnetic field or the depth to which the medium magnetic field penetrates into the MR film in the perpendicular direction (the depth direction) of the medium. The penetration amount of the medium magnetic field abruptly decreases if the depth $\underline{d}$ is larger than the characteristic length $\lambda$ whose expression is presented earlier. To allow the signal magnetic field to effectively penetrate into the MR film, it is desirable that the depth $\underline{d}$ be smaller than the characteristic length $\lambda$. Also, it is evident from the above expression that the reproduced output is increased by decreasing the depth $\underline{d}$.

When a metal thin-film medium is used as the magnetic recording medium, the depth $\underline{d}$ need not be decreased to be smaller than the characteristic length $\lambda$ since the medium magnetic field is sufficiently strong (if, in contrast, the depth $\underline{d}$ is made smaller than the characteristic length $\lambda$, the reproduced waveform is distorted by a strong signal magnetic field). Since the medium magnetic field of the magnetic recording medium of the present invention is weak, it is desirable that the depth $\underline{d}$ be made smaller than the characteristic length $\lambda$ as needed. More specifically, to obtain a recording density of up to 10 b/$in^2$, f, g, and t of the MR film are up to 1600, up to 0.12 µm, and up to 0.02 µm, respectively, so $\lambda$ is up to 1 µm. Accordingly, $\underline{d}$ is desirably up to 1 µm when a metal thin-film medium is used as the magnetic recording medium. On the other hand, since the medium magnetic field of the magnetic recording medium of the present invention is weaker than that of a metal thin-film medium, d<1 µm is desirable where necessary.

When the GMR is used as the magnetic head of the present invention, a high-sensitivity MR head can be realized because of a large resistivity change rate $\Delta \rho/\rho$. It is difficult to apply a bias with a small depth in the case of a soft magnetic film stacked bias type MR head which is the main stream of present day MR heads. This is because the operating point is shifted by a depth variation or the sensitivity significantly decreases upon application of an appropriate bias. However, if a magnetic multilayered film is used as the GMR, the magnetization of one of adjoining magnetic layers is fixed in the inflow direction of the medium magnetic field, and the magnetization of the other magnetic layer is fixed in a direction perpendicular to the first direction while a high magnetic permeability is held for signal magnetic field up to 0. Consequently, it is possible to stably realize a broad-range linear response even with a small depth. When this improvement is done in the MR head, a high reproduced output can be obtained even if the medium magnetic field is decreased by increasing the ratio of the nonmagnetic matrix for the purpose of improving the durability.

The present invention is suitable for a magnetic recording/reproduction apparatus, in which the spacing from the magnetic region of the magnetic recording medium to the magnetic head is 0.05 µm or less during driving, for the reasons explained below. That is, even a presently most advanced magnetic recording/reproduction apparatus which uses the combination of a metal thin-film medium and a magnetic head and technically ensures 1 to 2 Gb/$in^2$ requires up to 0.012 µm or more as the thickness of the protective film formed on the magnetic recording medium and up to 0.038 µm as the floating amount of the magnetic recording medium from the magnetic head. Stable recording and reproduction become difficult to perform if the thickness of the protective film or the floating amount is further decreased. Also, when the long-term reliability required for practical use is taken into account, it is necessary to further increase the floating amount and the protective film thickness. According to the present invention, even if the thickness of the protective film formed on the magnetic recording medium is decreased to be 0.012 µm or smaller, a sufficient durability can be assured by the nonmagnetic matrix. Consequently, the spacing which is the thickness of the protective film plus the floating amount can be set to 0.05 µm or less. As a result, it is possible to realize high-density magnetic recording/reproduction (particularly linear recording density) which cannot be effectuated by the magnetic recording/reproduction apparatus using the combination of the metal thin-film medium and the MR head.

The present invention will be described in more detail below by way of its examples with reference to the accompanying drawings.

EXAMPLE 1

As shown in the sectional view of FIG. 1, a magnetic thin film consisting of magnetic metal grains 1 and a nonmagnetic matrix 2 was formed on a glass substrate 1 by using a sputtering process as follows. That is, two-target simultaneous sputtering was performed in a 1-Pa Ar atmosphere by using CoPt and Si—O targets, forming a 50-nm thick magnetic thin film. This magnetic thin film was found to be constituted by magnetic metal grains made from CoPt and a nonmagnetic matrix made from Si—O. The composition of the nonmagnetic matrix was close to $SiO_2$. This material has a Vickers hardness of 2 GPa in a bulk form. The resultant magnetic thin film was dipped into aqua regia to selectively dissolve only CoPt. Consequently, it was confirmed that only the nonmagnetic matrix portion remained unchanged in the form of the original magnetic thin film and this nonmagnetic matrix was continuously present in the direction of film thickness and the in-plane direction of the magnetic thin film.

When the magnetic thin film was observed by a TEM, an image as shown in FIG. 5 was observed. In the central portion of the CoPt magnetic metal grain, the contents of Si and O as the constituent elements of the nonmagnetic matrix were 5 atomic % or less. In the central portion of the Si—O nonmagnetic matrix, the content of Co as the magnetic element constituting the magnetic metal grains was 5 atomic % or less. The interface region between CoPt and Si—O was found to be a Co—O phase as a result of the precise composition analysis. This phase had a function of enhancing the coupling between the CoPt magnetic metal grains and the Si—O nonmagnetic matrix, and consequently the toughness of the whole magnetic thin film was improved. The result was that the durability as a magnetic recording medium was improved.

The magnetic characteristics of the magnetic thin film were measured with the result that the film had perpendicular magnetic anisotropy, a coercive force Hc of approximately 160 kA/m (2000 Oe), and a saturation magnetization Is of approximately 0.5 Wb/$m^2$ (400 G). The packing ratio of CoPt was calculated by observing the magnetic thin film with a TEM and was found to be uniformly about 0.65 all over the thin film. The average volume of the magnetic metal grains was $4\times10^{-25}$ J/m$^3$. The average grain size of the magnetic metal grains in the in-plane direction when measured from the surface of the magnetic thin film was 3 to 4 nm, which was 1/10 or less the average diameter, 50 nm, of the magnetic clusters when the sample was AC-demagnetized. The magnetic metal grains had a long spheroidal shape; the ratio of (the length of the long axis)/(the length of the short axis) was 2 to 5, and the shape magnetic anisotropy was 2.1 to $3.2\times10^5$ J/m$^3$. The magneto-crystalline anisotropy of the CoPt magnetic metal grains was estimated by magnetic torque measurement and found to be $2\times10^6$ J/m$^3$. The electrical resistivity was approximately 10 Ω.cm when measured by bringing a probe into contact with the surface of the magnetic thin film.

To improve the characteristics of the above magnetic thin film, some elements were added to the magnetic metal grains and the nonmagnetic matrix. First, B was added to the magnetic metal grains in the magnetic thin film by performing sputtering using a CoPt target added with B. Consequently, the coercive force was increased to 220 kA/m. Composition analysis was done by using a TEM (Transmission Electron Microscope), and it was found that the average B concentration in the nonmagnetic matrix was 1/50 or less the average B concentration of the magnetic metal grains. On the other hand, Ta was added to the nonmagnetic matrix in the magnetic thin film by performing sputtering using an Si—O target added with Ta. The result was that the electrical conductivity of the magnetic thin film was decreased to approximately 10$^{-3}$ Ω.cm, and the probability of damages of the recording elements caused by a leakage current from the MR head was reduced. As a result of composition analysis done by using a TEM it was found that the average Ta concentration in the magnetic metal grains was 1/10 or less the average Ta concentration in the nonmagnetic matrix. Subsequently, B was added to both the magnetic metal grains and the nonmagnetic matrix by performing sputtering using the CoPt target added with B and the Si—O target added with B. Consequently, the addition of B to the magnetic metal grains increased the coercive force to 220 kA/m. Also, the addition of B to the nonmagnetic matrix reduced the strain of the whole magnetic thin film, improving the durability as a magnetic recording medium.

Each magnetic thin film discussed above was actually formed on a 2.5-inch disk-like glass substrate, recording and reproduction were evaluated, and the noise level was measured using a spectrum analyzer. As a result, in either of the above cases the DC erasure noise level and the noise level after the signal was recorded were the same. Additionally, a CSS (Contact Start Stop) test which is commonly used in evaluation of the sliding characteristics between a magnetic recording head and a medium was conducted. The result was that a durability of 500,000 times or more was obtained with no protective film formed.

EXAMPLE 2

A magnetic thin film was formed on a glass substrate as shown in FIG. 1 by using a sputtering process as follows. That is, three-target simultaneous sputtering was performed in an Ar atmosphere at an oxygen partial pressure of 10% by using Co, Fe, and Al targets, forming a 200-nm thick magnetic thin film. This magnetic thin film was found to be constituted by magnetic metal grains made from FeCo and a nonmagnetic matrix having a composition close to Al$_2$O$_3$. The material of this nonmagnetic matrix in a bulk form has a Vickers hardness of 12 GPa. The resultant magnetic thin film was dipped into aqua regia to selectively dissolve only FeCo. Consequently, it was confirmed that only the nonmagnetic matrix portion remained unchanged in the form of the original magnetic thin film and this nonmagnetic matrix was continuously present in the direction of film thickness and the in-plane direction of the magnetic thin film. When the magnetic thin film was observed by a TEM, an image as shown in FIG. 5 was observed. In the central portion of the FeCo magnetic metal grain, the contents of Al and O as the constituent elements of the nonmagnetic matrix were 5 atomic % or less. In the central portion of the Al—O nonmagnetic matrix, the contents of Co and Fe as the magnetic elements constituting the magnetic metal grains were 5 atomic % or less. Composition analysis was performed for the interface region between FeCo and Al—O, and it was found that a very thin FeCo—O phase was present. This phase had a function of enhancing the coupling between the FeCo magnetic metal grains and the Al—O nonmagnetic matrix, and consequently the toughness of the whole magnetic thin film was improved. The result was that the durability as a magnetic recording medium was improved.

The magnetic characteristics of the magnetic thin film were measured with the result that the film had longitudinal magnetic anisotropy, a coercive force Hc of approximately 160 kA/m, and a saturation magnetization Is of approximately 1 Wb/m$^2$. The packing ratio of FeCo was calculated by observing the magnetic thin film with a TEM and was found to be uniformly about 0.65 all over the thin film. The average volume of the magnetic metal grains was $4\times10^{-25}$ J/m$^3$. The average grain size of the magnetic metal grains in the in-plane direction when measured from the surface of the magnetic thin film was 3 to 4 nm, which was 1/10 or less the average diameter, 50 nm, of the magnetic clusters when the sample was AC-demagnetized. The magnetic metal grains had a long spheroidal shape; the ratio of (the length of the long axis)/(the length of the short axis) was 2 to 5, and the shape magnetic anisotropy was 5.4 to $8.2\times10^5$ J/m$^3$. The magneto-crystalline anisotropy of the FeCo magnetic metal grains was estimated by magnetic torque measurement and found to be $10^6$ J/m$^3$. The electrical resistivity was approximately 10 Ω.cm when measured by bringing a probe into contact with the surface of the magnetic thin film.

Subsequently, four-target simultaneous sputtering was performed in an Ar atmosphere at an oxygen partial pressure of 10% by using a Cr target, in addition to the three types of targets discussed above, thereby forming a 20-nm thick magnetic thin film. This magnetic thin film was found to be constituted by magnetic metal grains made from FeCoCr and an Al—O nonmagnetic matrix having a composition close to Al$_2$O$_3$. The coercive force Hc of the magnetic thin film was approximately 180 kA/m. Composition analysis was performed for the interface region between FeCO and Al—O, and it was found that very thin FeCo—O and Cr phases were present. These phases had a function of enhancing the coupling between the FeCo magnetic metal grains and the Al—O nonmagnetic matrix, and consequently the toughness of the whole magnetic thin film was improved. The result was that the durability as a magnetic recording medium was improved.

Additionally, a magnetic thin film was formed by performing four-target simultaneous sputtering following the same procedure as above except that bias sputtering was done. The coercive force of the resultant magnetic thin film was found to be 220 kA/m.

Furthermore, a magnetic thin film was formed by performing four-target simultaneous sputtering following the same procedure as above while a magnetic field of 40 kA/m on the average was applied in a direction perpendicular to the substrate by using a permanent magnet. The result was that the long axes of the magnetic metal grains in the resultant magnetic thin film pointed in a direction almost perpendicular to the film surface; that is, a perpendicular magnetic film was attained.

Note that results analogous to those discussed above were obtained when, for example, Pt, Sm, and Ni were used as the material of the magnetic metal grains, Zr, Ti, and B were used as the material of the nonmagnetic matrix, Ta, W, Hf, V, In, Si, and B were used as the additive elements to the magnetic metal, and nitrogen gas and an organic gas were used as the reactive gas.

Each magnetic thin film discussed above was actually formed on a 2.5-inch disk-like glass substrate, recording and reproduction were evaluated, and the noise level was measured using a spectrum analyzer. As a result, in either of the above cases the DC erasure noise level and the noise level after the signal was recorded were the same. Additionally, a CSS (Contact Start Stop) test which is commonly used in evaluation of the sliding characteristics between a magnetic recording head and a medium was conducted. The result was that a durability of 500,000 times or more was obtained with no protective film formed.

EXAMPLE 3

As shown in FIG. 2, a magnetic thin film consisting of magnetic metal grains 1 and a nonmagnetic matrix 2 was formed on a soft magnetic undercoating layer 12 formed on a glass substrate 11 by using a sputtering process as follows. That is, the soft magnetic undercoating layer 12 was formed on the glass substrate 11 by performing sputtering in an Ar atmosphere using an MnBi target. Subsequently, sputtering was performed in the Ar atmosphere by using a composite target in which MnBi and C were arranged into a mosaic pattern, thereby forming a 50-nm thick magnetic thin film on the soft magnetic undercoating layer 12. Thereafter, the magnetic thin film thus deposited was annealed at 400° C. for two hours. This magnetic thin film was found to be constituted by magnetic metal grains made from MnBi and a nonmagnetic matrix made from C. As a result of structural analysis, the C constituting the nonmagnetic matrix was found to be diamond-like carbon. The resultant magnetic thin film was dipped into aqua regia to selectively dissolve only MnBi. Consequently, it was confirmed that only the nonmagnetic matrix portion remained unchanged in the form of the original magnetic thin film and this nonmagnetic matrix was continuously present in the direction of film thickness and the in-plane direction of the magnetic thin film.

When the magnetic thin film was observed by a TEM, an image as shown in FIG. 3 was observed. In the central portion of the MnBi magnetic metal grain, the content of C as the constituent element of the nonmagnetic matrix was 10 atomic % or less. In the central portion of the C nonmagnetic matrix, the contents of Mn and Bi as the magnetic elements constituting the magnetic metal grains were 10 atomic % or less.

The magnetic characteristics of the magnetic thin film were measured with the result that the film had perpendicular magnetic anisotropy, a coercive force Hc of approximately 160 kA/m, and a saturation magnetization Is of approximately 1 Wb/m². The volume packing ratio of MnBi was calculated by observing the magnetic thin film with a TEM and was found to be uniformly about 0.65 all over the thin film. The average volume of the magnetic metal grains was $4 \times 10^{-25}$ m³. The average grain size of the magnetic metal grains in the in-plane direction when measured from the surface of the magnetic thin film was 3 to 4 nm, which was 1/10 or less the average diameter, 50 nm, of the magnetic clusters when the sample was AC-demagnetized. The magnetic metal grains had a long spheroidal shape; the ratio of (the length of the long axis)/(the length of the short axis) was 2 to 5, and the shape magnetic anisotropy was 1.7 to $2.6 \times 10^5$ J/m³. The magneto-crystalline anisotropy of the FeCo magnetic metal grains was estimated by magnetic torque measurement and found to be $8 \times 10^5$ J/m³. Also, the standard deviation of the spacings between the magnetic metal grains on the surface of the magnetic thin film was measured and found to be 0.8 nm.

The magnetic thin film discussed above was actually formed on a 2.5-inch disk-like glass substrate, recording and reproduction were evaluated, and the noise level was measured using a spectrum analyzer. As a result, in either of the above cases the DC erasure noise level and the noise level after the signal was recorded were the same. Additionally, a CSS (Contact Start Stop) test which is commonly used in evaluation of the sliding characteristics between a magnetic recording head and a medium was conducted. The result was that a durability of 500,000 times or more was obtained with no protective film formed.

EXAMPLE 4

As shown in FIG. 2, a magnetic thin film consisting of magnetic metal grains 1 and a nonmagnetic matrix 2 was formed on a non-magnetic undercoating layer 12 formed a glass substrate 11 by using a sputtering process as follows. That is, the non-magnetic undercoating layer 12 was formed on the glass substrate 11 by performing sputtering in an Ar atmosphere using a Cr target. Subsequently, three-target simultaneous sputtering was performed in the Ar+10% $N_2$ atmosphere by using CoPt, CrTa, and Si targets, thereby forming a magnetic thin film on the non-magnetic undercoating layer 12. This magnetic thin film was found to be constituted by magnetic metal grains made from CoPtCrTa and a nonmagnetic matrix made from Si—N. The resultant magnetic thin film was dipped into aqua regia to selectively dissolve only CoPtCrTa. Consequently, it was confirmed that only the nonmagnetic matrix portion remained unchanged in the form of the original magnetic thin film and this nonmagnetic matrix was continuously present in the direction of film thickness and the in-plane direction of the magnetic thin film.

When the magnetic thin film was observed by a TEM, an image as shown in FIG. 5 was observed. In the central portion of the CoPtCrTa magnetic metal grain, the contents of Si and N as the constituent elements of the nonmagnetic matrix were 5 atomic % or less. In the central portion of the Si—N nonmagnetic matrix, the contents of Co and Pt as the magnetic elements constituting the magnetic metal grains were 1 atomic % or less. Composition analysis was performed for the interface region between CoPtCrTa and Si—N, and it was found that a very thin Cr phase was present. This phase had a function of enhancing the coupling between the CoPtCrTa magnetic metal grains and the Si—N nonmagnetic matrix, and consequently the toughness of the whole magnetic thin film was improved. The result was that the durability as a magnetic recording medium was improved. This phase also had a function of inducing a composition modified structure in the magnetic metal grain, thereby improving the magnetic characteristics, particularly the coercive force.

The magnetic characteristics of the magnetic thin film were measured with the result that the film had longitudinal magnetic anisotropy, a coercive force Hc of approximately 200 kA/m, and a saturation magnetization Is of approximately 0.8 Wb/m². The packing ratio of CoPtCrTa was calculated by observing the magnetic thin film with a TEM and was found to be uniformly about 0.5 all over the thin film. The average volume of the magnetic metal grains was $4 \times 10^{-25}$ m³. The average grain size of the magnetic metal grains in the in-plane direction when measured from the surface of the magnetic thin film was 3 to 4 nm, which was ¹⁄₁₀ or less the average diameter, 50 nm, of the magnetic clusters when the sample was demagnetized by AC. The magnetic metal grains had a long spheroidal shape; the ratio of (the length of the long axis)/(the length of the short axis) was 2 to 5, and the shape magnetic anisotropy was 3.4 to $5.1 \times 10^5$ J/m³. The magneto-crystalline anisotropy of the CoPtCrTa magnetic metal grains was estimated by magnetic torque measurement and found to be $2 \times 10^6$ J/m³.

This magnetic recording medium was mounted in a drive unit, a magnetic head was brought into contact with the medium with no motion, and the electrical resistivity between the head and the spindle was measured at several portions. Consequently, the electrical resistivity was about $10^{-2}$ Ω.cm or more in every portion. When the saturation flux density Bs in the magnetic pole portion in the recording elements of the head was set at 0.4 T, no sufficient recording could be performed with a coercive force of 200 kA/m (2.5 kOe); that is, the noise was increased to decrease the signal-to-noise ratio (S/N ratio), and high-density recording was impossible. On the other hand, the noise was reduced to increase the S/N ratio by 8 dB when the saturation flux density in the magnetic pole portion was set at 1 T.

The sectional structure of this magnetic thin film was observed using a TEM, and it was found that a large number of voids about 2 nm in radius and about 3 nm in depth were present on the surface. This size was large enough to allow lubricant molecules several Å in diameter and several nm in length to enter.

A lubricant was coated on the magnetic recording medium having the above magnetic thin film, and the adhesion was checked by driving the head in a contact state. Consequently, it was found that the durability was improved compared to a magnetic recording medium made of a CoPtCrTa metal thin film. Also, in a varnishing process which is the pre-process of the lubricant coating process, the magnetic metal grain portion and the nonmagnetic matrix portion were scraped off to different degrees. By using this it was possible to form a larger number of larger voids in the surface. Therefore, the magnetic thin film in the magnetic recording medium of the present invention has the advantage that voids for burying the lubricant can be readily formed without increasing the number of steps, in comparison with a metal thin-film medium which is uniformly scraped off in the direction of film thickness.

To improve the magnetic characteristics of the above magnetic thin film, a magnetic thin film consisting of CoPtCrTa magnetic metal grains and an Si—N nonmagnetic matrix was formed on a nonmagnetic undercoating layer following the same procedure as discussed above except that four-target simultaneous bias sputtering was performed in an Ar atmosphere at a nitrogen partial pressure of 10% by using CoPt, CrTa, Si—O, and Si targets.

The magnetic characteristics of this magnetic thin film were measured with the result that the film had longitudinal magnetic anisotropy, a coercive force Hc of approximately 220 kA/m, and a saturation magnetization Is of approximately 0.9 Wb/m². Composition analysis was performed for a fine region of the magnetic thin film by using a TEM. Consequently, in the central portion of the CoPtCrTa magnetic metal grain, the contents of Si and N as the constituent elements of the nonmagnetic matrix were 1 atomic % or less, and the content of O was 10 atomic % or less. In the central portion of the Si—N nonmagnetic matrix, the content of Co and Pt as the magnetic elements constituting the magnetic metal grains were 1 atomic % or less. It was also found that an interface region was present between the CoPtCrTa magnetic metal grains and the Si—N nonmagnetic matrix. This interface region was found to consist of Cr and $SiO_2$. These Cr and $SiO_2$ had a function of enhancing the coupling between the CoPtCrTa magnetic metal grains and the Si—N nonmagnetic matrix, and consequently the toughness of the whole magnetic thin film was improved. The result was that the durability as a magnetic recording medium was improved. The Cr and $SiO_2$ also had a function of inducing a composition modified structure in the magnetic metal grain and preventing mutual diffusion of the constituent atoms, thereby improving the coercive force.

To check the effect of the nonmagnetic Cr undercoating layer, a magnetic thin film was formed on a glass substrate without forming a nonmagnetic undercoating layer, as a comparative example. This magnetic thin film had a structure in which the magnetic metal grains and the nonmagnetic matrix were separated. However, the crystallinity of the magnetic metal grains was low, so the coercive force was 80 kA/m and the magneto-crystalline anisotropy was $2 \times 10^5$ J/m³.

Reproduction was performed for a magnetic recording medium using the above magnetic thin film by using an MR head mounted on a floating type slider. The result was an increase in the probability of electrostatic destruction of the MR elements caused by charge-up of the medium. Therefore, conductivity was imparted to the nonmagnetic matrix of the medium. First, a magnetic thin film consisting of CoPtCrTa magnetic metal grains and a Ti-N nonmagnetic matrix was formed on a glass substrate following the same procedure as discussed above except that Ti was used in place of Si. The resultant magnetic thin film was dipped into aqua regia to selectively dissolve only CoPtCrTa. Consequently, it was confirmed that only the nonmagnetic matrix portion remained unchanged in the form of the original magnetic thin film and this nonmagnetic matrix was continuously present in the direction of film thickness and the in-plane direction of the magnetic thin film. The magnetic characteristics of the magnetic thin film were nearly identical with those of the magnetic thin film discussed above.

This magnetic recording medium was mounted in a drive unit, a magnetic head was brought into contact with the medium with no motion, and the electrical resistivity between the head and the spindle was measured at several portions. Consequently, the electrical resistivity was about $5 \times 10^{-2}$ Ω.cm or more in every portion. The damage probability of the MR head was decreased by using the magnetic recording medium having this magnetic thin film.

Furthermore, a magnetic thin film consisting of CoPtCrTa magnetic metal grains and an InSnO (ITO) nonmagnetic matrix was formed on a glass substrate following the same procedure as discussed above except that In—Sn—O was used in place of Si and oxygen was used in place of nitrogen. The resultant magnetic thin film was dipped into aqua regia to selectively dissolve only CoPtCrTa. Consequently, it was confirmed that only the nonmagnetic matrix portion remained unchanged in the form of the original magnetic thin film and this nonmagnetic matrix was continuously present in the direction of film thickness and the in-plane direction of the magnetic thin film. The magnetic characteristics of the magnetic thin film were nearly identical with those of the magnetic thin film discussed above.

This magnetic recording medium was mounted in a drive unit, a magnetic head was brought into contact with the medium with no motion, and the electrical resistivity between the head and the spindle was measured at several portions. Consequently, the electrical resistivity was about $10^{-3}$ Ω.cm or more in every portion. The damage probability of the MR head was further decreased by using the magnetic recording medium having this magnetic thin film.

Each magnetic thin film discussed above was actually formed on a 2.5-inch disk-like glass substrate, recording and reproduction were evaluated, and the noise level was measured using a spectrum analyzer. As a result, in either of the above cases the DC erasure noise level and the noise level after the signal was recorded were the same. Additionally, a CSS (Contact Start Stop) test which is commonly used in evaluation of the sliding characteristics between a magnetic recording head and a medium was conducted. The result was that a durability of 500,000 times or more was obtained with no protective film formed.

EXAMPLE 5

Figure 10:
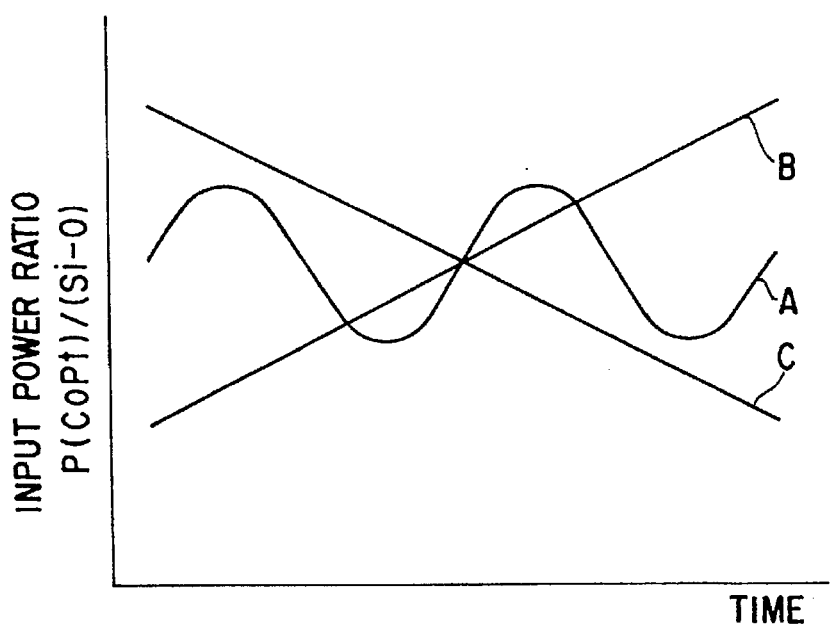
FIG. 10 is a graph for explaining the method of changing the input power ratio of a CoPt target to an SiO target in the formation of a magnetic thin film in Example 5 of the present invention.

In growing magnetic thin films similar to those in Example 1, the input power ratio of the CoPt target to the Si—O target was changed by three different methods as shown in FIG. 10: in the method indicated by A, the input power ratio was periodically changed in the form of a sinusoidal wave; in the method indicated by B, the ratio of the input power to CoPt to the input power to Si—O was gradually increased; and in the method indicated by C, the ratio of the input power to CoPt to the input power to Si—O was gradually decreased. The sections of the magnetic thin films formed by these methods were observed with a TEM, checking a change in the packing ratio of the magnetic metal grains in the direction of film thickness and the characteristics of each magnetic thin film.

The magnetic thin film formed by the method in which the input power ratio was changed as indicated by A caused almost no peeling in a peel test using an adhesive tape. On the other hand, a magnetic thin film formed with the input power ratio kept constant was readily peeled. This result demonstrates that the internal stress of the magnetic thin film was reduced by the method A. Also, the magnetic thin film was dipped into aqua regia to selectively dissolve only CoPt. Consequently, it was confirmed that only the nonmagnetic matrix portion remained unchanged in the form of the original magnetic thin film and this nonmagnetic matrix was continuously present in the direction of film thickness and the in-plane direction of the magnetic thin film.

In the magnetic thin film formed by the method in which the input power ratio was changed as indicated by B, the packing ratio of CoPt increased toward the surface of the magnetic thin film. Also, this magnetic thin film was not at all peeled in the peel test using an adhesive tape.

In the magnetic thin film formed by the method in which the input power ratio was changed as indicated by C, the packing ratio of CoPt decreased toward the surface of the thin magnetic film. The electrical resistivity was measured by bringing a probe into contact with the surface of the magnetic thin film and was found to be approximately 80% of the electrical resistivity of the magnetic thin film formed with the input power ratio held constant.

Note that the adhesion properties of the magnetic thin film were improved when sputter etching was performed before the growth of the magnetic thin film on the glass substrate. For example, even the magnetic thin film formed with the input power ratio kept constant decreased the degree of peeling in the peel test. The coercive force of the magnetic thin film increased from 160 kA/m to 200 kA/m. These effects were achieved because the surface roughness of the substrate changed and the free oxygen on the surface of the substrate disappeared when the Ar ions were bombarded on the glass substrate during the sputter etching process. Note that similar effects can be obtained by surface modification methods, such as neutron beam irradiation and ion plating, other than the sputter etching process.

Each magnetic thin film discussed above was actually formed on a 2.5-inch disk-like glass substrate, recording and reproduction were evaluated, and the noise level was measured using a spectrum analyzer. As a result, in either of the above cases the DC erasure noise level and the noise level after the signal was recorded were the same. Additionally, a CSS (Contact Start Stop) test which is commonly used in evaluation of the sliding characteristics between a magnetic recording head and a medium was conducted. The result was that a durability of 500,000 times or more was obtained with no protective film formed.

As can be seen from Examples 1 to 5, the magnetic recording medium of the present invention is capable of high-density recording.

EXAMPLE 6

FIGS. 11A to 11C are perspective views showing one embodiment of the magnetic recording/reproduction apparatus of the present invention. As in FIG. 11A, this magnetic recording/reproduction apparatus of the present invention comprises a magnetic recording medium 110 and a magnetic head 120.

As illustrated in FIG. 11B, the magnetic recording medium 110 has a structure in which a thin-film recording portion 113 is formed on a substrate 111 made from glass or a metal such as Al via an undercoating film 112 made from an insulating material such as $Al_2O_3$. This thin-film recording portion 113 consists of a nonmagnetic matrix 1131 present in the form of a network in the direction of film thickness and in the in-plane direction of the nonmagnetic medium, and magnetic metal grains 1132 held in the nonmagnetic matrix 1131. A protective film made from, e.g., amorphous carbon, diamond carbon, or ZrO, can also be formed on the thin-film recording portion 113 if necessary. In forming the protective film, the thickness of the protective film is desirably 10 nm or less in order to achieve the effect of the present invention. This magnetic recording medium is manufactured by growing the undercoating film 112 on the substrate 111 by using sputtering, vapor deposition, CVD, or the like method, and forming the thin-film recording portion 113 on the undercoating film 112 by using, e.g., reactive multi-target sputtering or multi-target simultaneous vapor deposition, which uses two or more sputtering targets.

As shown in FIG. 11C, the magnetic head 120 is manufactured by forming a reproduction section and a recording section on a substrate 121 constructed from a mixture of alumina and TiC. The reproduction section includes a lower shield film 131 on the substrate 121, an MR unit 133 formed on the lower shield film 131 via a lower insulating film (not shown), an electrode 134 electrically connected to the MR unit 133, and an upper shield film 136 formed on the electrode 134 via an upper insulating film (not shown). The recording section formed on the reproduction section includes a recording magnetic pole 1611, a recording coil 163 formed on the recording magnetic pole 1611 via an insulating film (not shown), and another recording magnetic pole 1612 formed on the recording coil 163 via an insulating film (not shown).

FIG. 12 shows the detailed arrangement of the MR unit 133. In FIG. 12, reference numeral 1333 denotes a soft magnetic film for applying an operating point bias, which is made from amorphous CoZrNb or the like material. A single-layer MR film 1331 made from, e.g., NiFe, is formed only in a region, which is affected by the magnetic field between the electrodes, on the soft magnetic film 1333 via an interlayer 1332 constructed from, e.g., Ti or TiN. Thus the MR unit 133 is constituted by the multilayered film, and only on the edges in the track width direction of this multilayered film a Barkhausen noise controlling magnetic film 1334 is formed. This Barkhausen noise controlling magnetic film 1334 is constituted by an antiferromagnetic film made from, e.g., FeMn, NiO, or NiMn, or a hard film made from, e.g., CoPt or CoNiCr. Electrodes 134 are formed inside the Barkhausen noise controlling magnetic film 1334.

In the MR unit 133, it is also possible to stack a shunt film constructed from, e.g., Zr or Ta, instead of the soft magnetic film and apply the operating point bias to this shunt film. Note that if this shunt film is formed the interlayer 1332 is unnecessary. Note also that the length (the depth of the element width) of the MR unit 133 from the front end portion on the side of the magnetic recording medium is desirably smaller than that when a metal thin-film medium is used as the magnetic recording medium. For example, it is desirable that the length be set at less than 1 μm when the recording density is 1 to 2 Gb/in$^2$.

Another arrangement of the MR unit 133 is shown in FIG. 13. Reference numeral 140 denotes a magnetic film made from CoFe, Co, NiFe, or NiFeCo, or from a stacked body of these substances. On the magnetic film 140, a nonmagnetic film 141, a magnetic film 142, and a bias film 143 is stacked in this order. The nonmagnetic film 141 is made from Cu, Ag, or Au, or from an alloy of these substances. The magnetic film 142 is made from CoFe, Co, NiFe, or NiFeCo, or from a stacked body of these substances. The bias film 143 pins only the magnetization of the magnetic film 142 in a predetermined direction. This bias film 143 is constituted by an antiferromagnetic film such as an FeMn or NiMn film or a hard film such as a CoPt film. Note that below the magnetic film 140, i.e., between the substrate 121 and the magnetic film 140, it is possible, if necessary, to form an undercoating film such as a nonmagnetic film for controlling the orientation or the smoothness or a magnetic undercoating film for applying a bias magnetic field to the magnetic film 140. Electrodes 134 are formed on the bias film 143 via a protective film (not shown).

In the MR unit 133 with the above arrangement, a large resistance change rate (3 to 15%) resulting from a spin-dependent scattering can be obtained by setting the thicknesses of the magnetic films 140 and 142 to 1 to 20 nm and the thickness of the nonmagnetic film to 1 to 10 nm.

Figure 14:
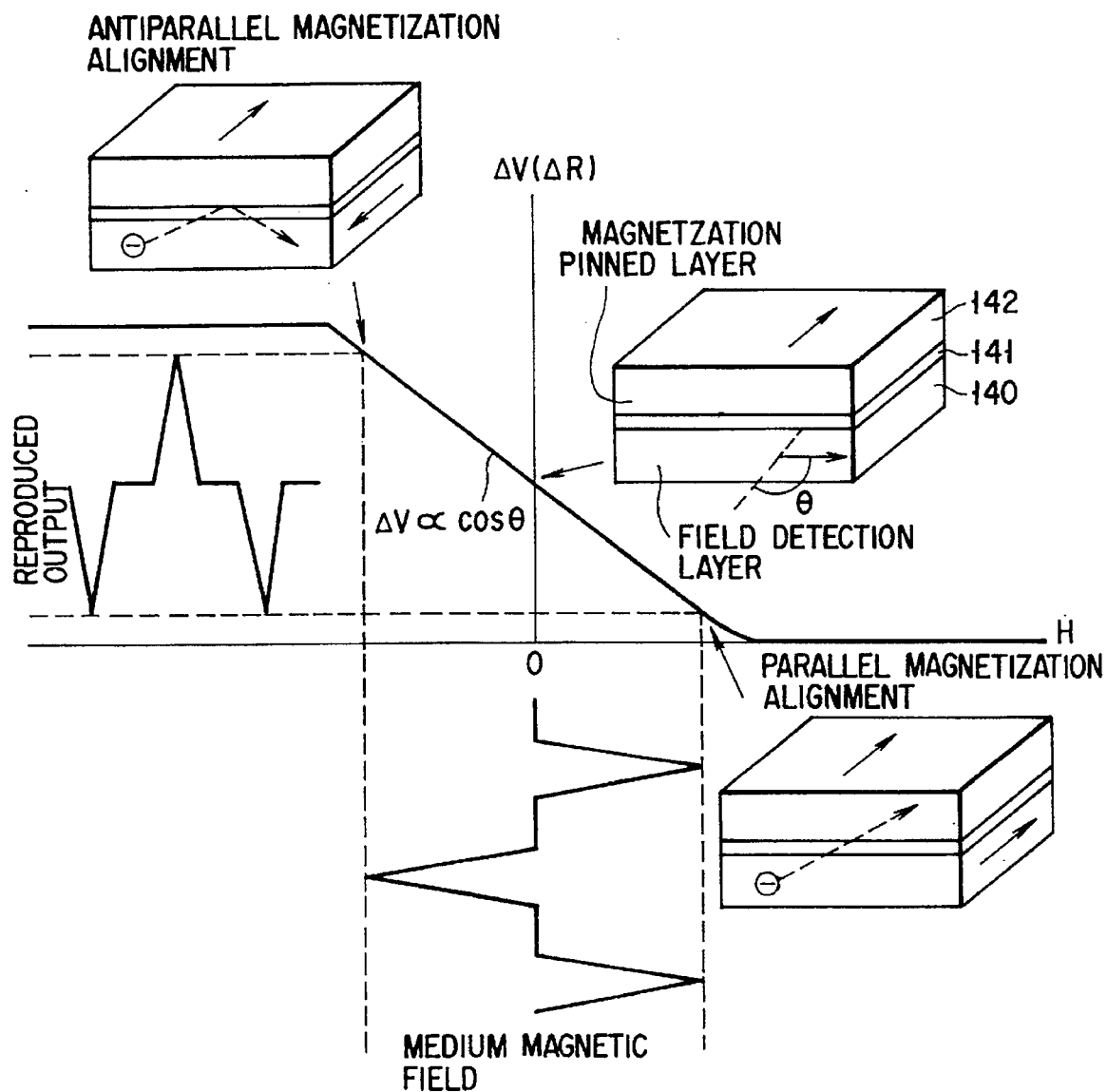
FIG. 14 is a view showing a practical example of signal magnetic field detection for the MR film of the magnetic head of the magnetic recording/reproduction apparatus of the present invention.

FIG. 14 shows the typical resistance-magnetization curve obtained in this structure. As can be seen from FIG. 14, the magnetizations of the magnetic films 140 and 142 are substantially orthogonal to each other for no signal magnetic field. When a negative signal magnetic field (whose direction is reverse to the direction of the bias magnetic field from the bias film 143) is applied to this MR unit, only the magnetization of the magnetic film 140 is rotated and the directions of the magnetizations of the magnetic films 140 and 142 become antiparallel, since the magnetization of the magnetic film 142 is pinned in the direction of a positive signal magnetic field. The result is a linear increase in the resistance. In contrast, when the positive signal magnetic field is applied to the MR unit the magnetization directions of the two magnetic films become parallel to each other, with the result that the resistance linearly decreases. That is, a broad linear response centering around signal magnetic field—0 can be obtained. In this method, even if the operating point shifts from signal magnetic field up to 0 due to, e.g., the magnetic coupling between the magnetic films 140 and 142 or the magnetostatic coupling from the magnetic film 140, distortion hardly occurs in the reproduced waveform because the linear response range is wide. Accordingly, a stable linear response operation can be assured even when the depth of the MR unit 133 is decreased.

In the MR unit illustrated in FIG. 12, an NiFe film formed by sputtering and having a thickness of 15 nm and magnetic anisotropy Hk=4 Oe was used as the MR film 1331. The dimension (length) in the longitudinal direction of the MR film 1331 was set to 100 μm, the dimension (depth) in the widthwise direction of the film 1331 was set to 0.7 μm and 1.2 μm (after depth control polishing). Also, a 5-nm thick TiN film was used as the interlayer 1332, and a 40-nm thick CoZrNb film was used as the soft magnetic film 1333. This stacked film was formed on an Al substrate, and electrodes (MR leads) were formed with a spacing of 2 μm on the stacked film. A 1.5-μm thick CoZrNb film was used as the shield film, and a 3-μm thick CoZrNb film was used as the recording magnetic pole. The gap on one side of the shield film/MR film was set to 0.12 μm, the recording track width (the width of the recording magnetic pole in the front end portion on the side of the magnetic recording medium) was set to 5 μm, and the recording coil was wound twelve turns. In this manner, a so-called 50% slider recording/ reproduction integrated head was manufactured.

Meanwhile, by using Si—O whose composition was close to $SiO_2$ as the nonmagnetic matrix and CoPt magnetic metal grains, the magnetic recording medium of the present invention was manufactured by forming a 25-nm magnetic thin film on a glass substrate by two-target simultaneous sputtering using a CoPt target and an $SiO_2$ target. Note that no protective film was formed on the magnetic thin film. The resultant recording medium was found to have an Hc of 160 kA/m, a saturation magnetization of 0.35 Wb/m$^2$, and a residual magnetization ratio of 0.8. The packing ratio of the magnetic metal grains of this magnetic recording medium was 0.35 when checked using a transmission electron microscope. Also, the electrical resistivity of the magnetic recording medium as measured on the surface of the magnetic thin film was 0.1 Ω.m.

By using the magnetic head and the magnetic recording medium thus manufactured, the electromagnetic change characteristic was measured with a floating amount of 0.04 μm in a 2.5" hard disk drive. The result was a linear recording density characteristic shown in FIG. 15. For comparison, a similar measurement was done by using a conventional example which employed an MR head having the same structure as above with a depth of 1.2 μm, and a CoPtCr metal thin-film medium in which a 15-nm $SiO_2$ film was formed as a protective film. In this metal thin-film medium, the Hc was 22 kA/m, the saturation magnetization was 0.5 Wb/m$^2$, the residual magnetization ratio was 0.8, and the thickness of the CoPtCr film was 25 nm. The result is also shown in FIG. 15.

Figure 15:
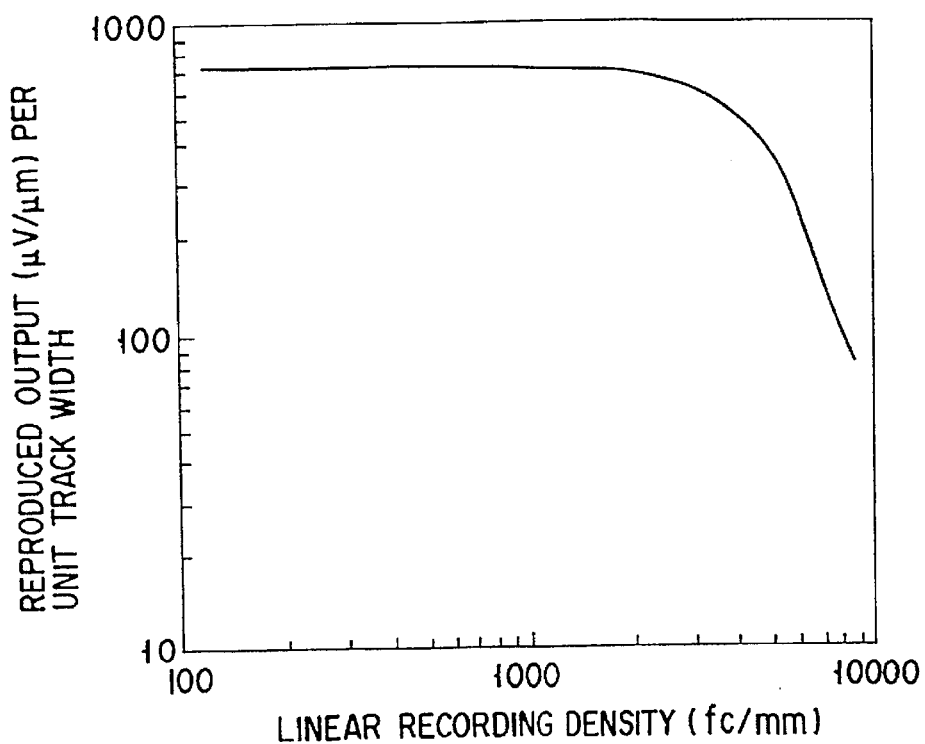

As is apparent from FIG. 15, the output in a low-frequency region increased as the depth decreased. A linear recording density $D_{50}$ at which the output in the low-frequency region was reduced by one-half was 5200 fc/mm for the depths of both 1.2 μm and 0.7 μm. In the present invention, the output in the low-frequency region decreased since the nonmagnetic matrix decreased the saturation magnetization compared to the conventional example. However, the output in the low-frequency region could be increased by decreasing the depth. Additionally, in the present invention no deterioration caused by distortion in the reproduced waveform was found even with the depth of 0.7 μm. Furthermore, a phenomenon in which the MR head was destroyed by a short circuit during the measurement was not observed.

In contrast, in the conventional example the $D_{50}$ was 4000 fc/mm, so a larger output could be obtained even when the linear recording density increased to be 4000 fc/mm or more with the depth remaining the same. In the case of the metal thin-film medium, however, when the depth was decreased to 0.7 μm the reproduced waveform distortion increased to degrade the S/N ratio.

A magnetic recording/reproduction apparatus using GMR will be described below.

Figure 16:
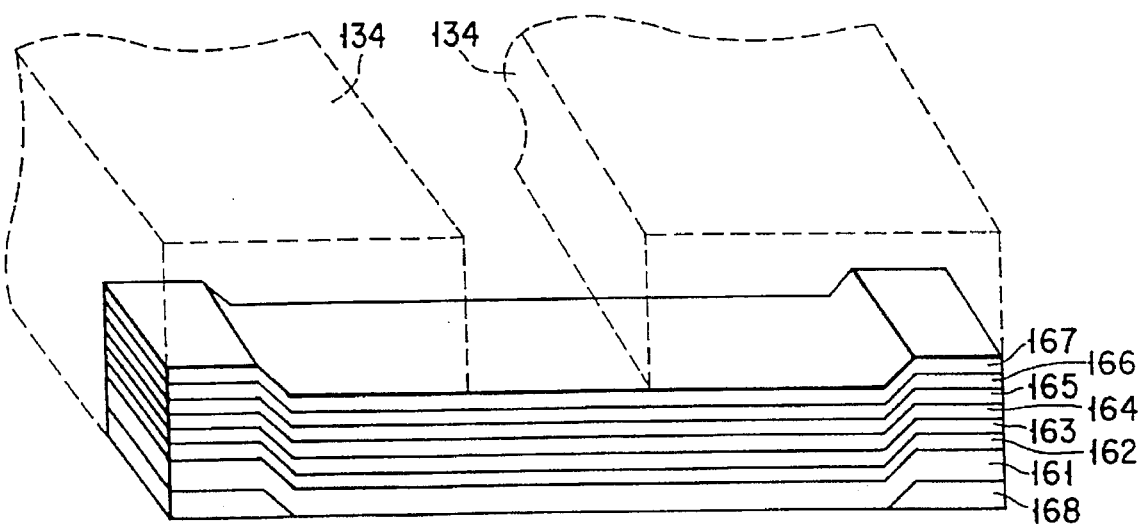

FIG. 16 shows the arrangement of an MR unit using GMR. Reference numeral 171 denotes a 10-nm thick CoZrNb film formed on a shield gap film. On the CoZrNb film 171, a 2-nm thick NiFe film 172, a 2.5-nm thick $Co_{90}Fe_{10}$ film 173 (a magnetic film), a 3-nm thick nonmagnetic film 174, a 2.5-nm thick $Co_{90}Fe_{10}$ film 175 (a magnetic film), a 10-nm thick $Fe_{50}Mn_{50}$ film 176 (a bias film), and a 10-nm thick TiN film 177 (a protective film) are formed in the order named. Note that a CoPt film 168 as a bias application film for removing Barkhausen noise is previously formed on the edges of the CoZrNb film 171.

In the MR head including the MR unit with the above arrangement, the dimension in the longitudinal direction of the MR film was set to 100 μm, the depth was set to 1.2 μm, and the spacing between the electrodes (the MR leads) was set to 2 μm. A shield layer and a recording section were formed in the same manner as in the recording/reproduction integrated head discussed above, thereby completing the MR head.

By using the magnetic head and the magnetic recording medium thus manufactured, the electromagnetic change characteristics were measured with a floating amount of 0.04 μm in a 2.5" hard disk drive. The result was linear recording density characteristics shown in FIG. 17. As is evident from FIG. 17, in the magnetic recording/reproduction apparatus of the present invention, it was possible to obtain a larger reproduced output than in a magnetic recording/ reproduction apparatus using the combination of a MR head and a metal thin-film medium presently available, even when a magnetic recording medium having a weak medium magnetic field was used. Additionally, $D_{50}$ was 5000 fc/mm, i.e., the linear recording density was improved.

As has been discussed above, the magnetic recording medium of the present invention has a magnetic thin film consisting of magnetic metal grains and a nonmagnetic matrix. The hardness of the nonmagnetic matrix is larger than that of the magnetic metal grains, the magnetic metal grains have shape magnetic anisotropy and magneto-crystalline anisotropy, and in the nonmagnetic matrix the content of the magnetic metal element in the central portion between the magnetic metal grains is 20 atomic % or less. Accordingly, the magnetic recording medium is capable of high-density recording.

The magnetic recording/reproduction apparatus of the present invention comprises a magnetic recording medium consisting of a nonmagnetic matrix, which is continuously present in the direction of film thickness and the in-plane direction of a magnetic thin film, and magnetic metal grains held in the nonmagnetic matrix, and a magnetic head for reproducing a signal from the magnetic recording medium by using a resistance change caused by the magnetic field. With this arrangement it is possible to narrow the magnetic spacing between the magnetic recording medium and the magnetic head, and as a result the recording density is improved.

According to the present invention, an electrically insulating material can be used as the material of the nonmagnetic matrix, and this results in a high electrical resistance of the magnetic recording medium. Consequently, it is possible to prevent short circuits between the magnetic head (MR head) and the magnetic recording medium.

Furthermore, according to the present invention, the magnetic metal grains are isolated by the nonmagnetic matrix so that no exchange interaction occurs between them. As a consequence, the noise of the magnetic recording medium can be reduced. Note that the use of a high-sensitivity MR head can solve the problem that the reproduced output is decreased due to a decrease in the strength of the medium magnetic field that is caused by the use of the nonmagnetic matrix.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic recording medium having a magnetic thin film made of magnetic metal grains and a nonmagnetic matrix, wherein a hardness of said nonmagnetic matrix is larger than a hardness of said magnetic metal grains, said magnetic metal grains have shape magnetic anisotropy and magneto-crystalline anisotropy, and a content of a magnetic metal element is not more than 20 atomic % in a region from 10–90% of the average distance between adjacent particles as measured in a planar cross-section between the boundary of said grains and said nonmagnetic matrix.

2. A medium according to claim 1, wherein a content of a constituent element of said nonmagnetic matrix is not more than 20 atomic % in a central 80% region of said magnetic metal grains.

3. A medium according to claim 1, wherein said magnetic metal grains are made from at least one element selected from the group consisting of Co, Pt, Sm, Fe, Ni, Cr, Mn, Bi, Al, and alloys thereof.

4. A medium according to claim 1, wherein said nonmagnetic matrix is made from a compound represented by Formula M-G, wherein M represents at least one element selected from the group consisting of Si, Al, Zr, Ti, and B, and G represents at least one element selected from the group consisting of oxygen, nitrogen, and carbon, or from an allotrope of carbon.

5. A medium according to claim 1, wherein a packing ratio of said magnetic metal grains to said nonmagnetic matrix is not more than 0.7.

6. A medium according to claim 1, wherein a packing ratio of said magnetic metal grains changes along a direction of film thickness of said magnetic thin film.

7. A medium according to claim 1, wherein an average grain size of said magnetic metal grains in an in-plane direction is not more than $1/10$ an average size of magnetic clusters when AC demagnetization is performed.

8. A medium according to claim 1, wherein an electrical resistivity of said magnetic thin film is not less than $10^{-4}$ Ω.cm.

9. A magnetic recording/reproduction apparatus comprising:
   a magnetic recording medium having a magnetic thin film made of a nonmagnetic matrix, which is continuously present in a direction of film thickness and an in-plane direction of a magnetic thin film, and magnetic metal grains held in said nonmagnetic matrix, wherein a hardness of said nonmagnetic matrix is larger than a hardness of said magnetic metal grains, said magnetic metal grains having shape magnetic anisotropy and magnetocrystalline anisotropy, and a content of a magnetic metal element is not more than 20% in a region from 10–90% of the average distance between adjacent particles as measured in a planar cross-section between the boundary of said grains and said nonmagnetic matrix; and
   a magnetic head for reproducing a signal from said magnetic recording medium by using a resistance change caused by a magnetic field.

10. An apparatus according to claim 9, wherein said magnetic head utilizes a magnetoresistance effect resulting from spin-dependent scattering.

11. An apparatus according to claim 9, wherein when said magnetic head and said magnetic recording medium are in contact with each other, an electrical resistivity between any conductive portion of said magnetic head and a substrate of said magnetic recording medium or a spindle is not less than 0.01 Ω.m.

12. An apparatus according to claim 9, wherein in reproducing a signal from said magnetic recording medium, a spacing between a magnetic surface, which opposes said magnetic head, of said magnetic recording medium and a front end of said magnetic head is not more than 0.05 μm.

13. An apparatus according to claim 1, wherein a content of a constituent element of said nonmagnetic matrix is not more than 20 atomic % in a central 80% region of said magnetic metal grains.

14. An apparatus according to claim 9, wherein said magnetic metal grains are made from at least one element selected from the group consisting of Co, Pt, Sm, Fe, Ni, Cr, Mn, Bi, Al, and alloys thereof.

15. An apparatus according to claim 9, wherein said nonmagnetic matrix is made from a compound represented by Formula M-G, wherein M represents at least one element selected from the group consisting of Si, Al, Zr, Ti, and B, and G represents at least one element selected from the group consisting of oxygen, nitrogen, and carbon, or from an allotrope of carbon.

16. An apparatus according to claim 9, wherein a packing ratio of said magnetic metal grains to said nonmagnetic matrix is not more than 0.7.

17. An apparatus according to claim 9, wherein a packing ratio of said magnetic metal grains changes along a direction of film thickness of said magnetic thin film.

18. An apparatus according to claim 9, wherein an average grain size of said magnetic metal grains in an in-plane direction is not more than $1/10$ an average size of magnetic clusters when AC demagnetization is performed.

19. An apparatus according to claim 9, wherein an electrical resistivity of said magnetic thin film is not less than $10^{-4}$ Ω.cm.

20. A magnetic recording medium having a magnetic thin film made of magnetic metal grains and a nonmagnetic matrix, wherein a hardness of said nonmagnetic matrix is larger than a hardness of said magnetic metal grains, said magnetic metal grains have shape magnetic anisotropy and magneto-crystalline anisotropy, a content of a magnetic metal element is not more than 20 atomic % in a region from 10–90% of the average distance between adjacent particles as measured in a planar cross-section between the boundary of said grains and said nonmagnetic matrix, and an average grain size of said magnetic metal grains in an in-plane direction is not more than $1/10$ an average size of magnetic clusters when AC demagnetization is performed.

* * * * *

UNITED STATES PATENT AND TRADEMARK OFFICE
CERTIFICATE OF CORRECTION

PATENT NO. : 5,652,054
DATED : July 29, 1997
INVENTOR(S) : Akira KIKITSU et al.

It is certified that error appears in the above-identified patent and that said Letters Patent is hereby corrected as shown below:

On the Title Page, item [54], and Col. 1, line 3, "METALS" should read --METAL--.

In Claim 8, column 35, line 5, "$\Omega.cm$" should read --$\Omega\cdot cm$--.

In Claim 11, column 35, line 33, "$\Omega.m$" should read --$\Omega\cdot cm$--.

In Claim 19, column 36, line 25, "$\Omega.cm$" should read --$\Omega\cdot cm$--.

Signed and Sealed this

Eighth Day of September, 1998

*Attest:*

BRUCE LEHMAN

*Attesting Officer*      *Commissioner of Patents and Trademarks*